United States Patent [19]

Kaizu et al.

[11] Patent Number: 5,359,690
[45] Date of Patent: Oct. 25, 1994

[54] CUTTING METHOD AND APPARATUS FOR REMOVING A SECONDARY COATING LAYER FROM A JACKETED OPTICAL FIBER

[75] Inventors: Ryosuke Kaizu; Hirotoshi Nagata; Nobuhide Miyamoto; Makoto Shimada, all of Funabashi, Japan

[73] Assignee: Sumitomo Cement Co., Ltd., Tokyo, Japan

[21] Appl. No.: 107,363

[22] Filed: Aug. 17, 1993

[30] Foreign Application Priority Data

| Aug. 21, 1992 | [JP] | Japan | 4-244044 |
| Oct. 13, 1992 | [JP] | Japan | 4-274483 |
| Dec. 22, 1992 | [JP] | Japan | 4-087823[U] |
| Feb. 10, 1993 | [JP] | Japan | 5-003950[U] |
| Mar. 9, 1993 | [JP] | Japan | 5-009923[U] |

[51] Int. Cl.$^5$ .................. G02B 6/44; B26D 1/00; B26F 3/00; H02G 1/12
[52] U.S. Cl. .................. 385/134; 385/100; 385/136; 385/137; 385/147; 83/13; 83/879; 83/880; 83/885; 83/887; 225/1; 225/3; 225/69; 225/94; 225/96.5; 81/9.4; 81/9.51; 81/9.43
[58] Field of Search .............. 385/100, 102, 103, 134, 385/136, 137, 147; 83/13, 54–56, 879, 880, 884, 885, 886, 887; 81/9.4, 9.41, 9.43, 9.51; 225/1, 3, 6, 24, 56, 69, 91, 93, 94, 96.5, 103

[56] References Cited

U.S. PATENT DOCUMENTS

| 4,434,554 | 3/1984 | Korbelak | 30/90.8 |
| 4,969,703 | 11/1990 | Fyfe et al. | 81/9.4 X |
| 5,033,335 | 7/1991 | Yatsu et al. | 81/9.4 |
| 5,172,620 | 12/1992 | Faust | 83/13 |
| 5,235,664 | 8/1993 | Okada et al. | 385/134 |

FOREIGN PATENT DOCUMENTS

| 2806878A1 | 8/1979 | Fed. Rep. of Germany | 385/134 X |
| 3406917A1 | 9/1985 | Fed. Rep. of Germany | 385/134 X |
| 3529141A1 | 3/1987 | Fed. Rep. of Germany | 385/134 X |
| 3736581 | 5/1989 | Fed. Rep. of Germany | 385/134 X |
| 4025380C1 | 10/1991 | Fed. Rep. of Germany | 385/134 X |
| 4038414A1 | 6/1992 | Fed. Rep. of Germany | 385/134 X |
| 4206067A1 | 9/1992 | Fed. Rep. of Germany | 385/134 X |
| 4238773A1 | 5/1993 | Fed. Rep. of Germany | 385/134 X |
| 58-217902 | 12/1983 | Japan | 385/134 X |
| 61-238004 | 10/1986 | Japan | 385/134 X |
| 1-112205 | 4/1989 | Japan | 385/134 X |
| 2-5006 | 1/1990 | Japan | 385/134 X |
| 2-199410 | 8/1990 | Japan | 385/134 X |
| 2-262604 | 10/1990 | Japan | 385/134 X |
| 2212340 | 7/1989 | United Kingdom | 385/134 X |

*Primary Examiner*—Brian Healy
*Attorney, Agent, or Firm*—Nikaido Marmelstein Murray & Oram

[57] ABSTRACT

A jacket layer of a jacketed optical fiber is cut by a cutting method and apparatus in which (A) a terminal portion of a jacketed optical fiber is straightened and grasped by a fiber holder, and (B) a blade device having (a) a pair of cutting blades and (b) a blade holder in which device cutting edges of the blades are arranged in such a manner that the edges are opposite to each other through a gap left therebetween and are on one and the same plane, the straightened portion of the jacketed optical fiber extends at a substantially right angle to the plane, and a center line of the gap between the cutting edges intersects an axis of the straightened portion of the jacketed optical fiber, and is moved in at least one direction at a substantially right angle to the axis of the straightened portion of the jacketed optical fiber to cut the secondary coating layer at a depth equal to or larger than the thickness of the secondary coating layer but smaller than the total thickness of the primary and secondary coating layers.

25 Claims, 27 Drawing Sheets

CUTTING METHOD AND APPARATUS FOR REMOVING A SECONDARY COATING LAYER FROM A JACKETED OPTICAL FIBER

BACKGROUND OF THE INVENTION

1. Field of the Invention

The present invention relates to a cutting method and apparatus for removing a jacket layer from a jacketed optical fiber.

More particularly, the present invention relates to a cutting method and apparatus by which a jacket layer of a jacketed optical fiber is safely and steadily cut in a transversal direction at a substantially right angle to the longitudinal axis of the jacketed optical fiber with a high degree of accuracy and with a high reproducibility without damaging a base optical fiber of the jacketed optical fiber.

2. Description of the Related Art

A jacketed optical fiber comprises a base optical fiber made by, for example, quartz, and a jacket layer. The jacket layer comprises a primary coating layer covering the core optical fiber, and a secondary coating layer including a buffer layer located on the primary layer.

When an end of the jacketed optical fiber is joined to another optical fiber or an optical element, the jacket layer in a terminal portion of the jacketed optical fiber must be removed.

In the removal of the jacket layer, the jacket layer in the terminal portion of the jacketed optical fiber is cut in a transversal direction at a substantially right angle to a longitudinal axis of the jacketed optical fiber, the cut terminal portion of the jacket layer is drawn out, and the remaining primary coating layer in the terminal portion is removed by dissolving or decompose-dissolving in a treating liquid. During the removal of the jacket layer, the base optical fiber must be protected from damage.

If the base optical fiber becomes damaged, even if the damage is very small and cannot be detected by microscopic observation, the damaged base optical fiber is easily broken in a bending test at a probability of 20 to 40%.

Therefore, where the damaged base optical fiber is contained as a light guide in an optical system, the resultant optical system sometimes experiences problems due to breakage of the base optical fiber and thus exhibits poor reliability for practical use.

In a conventional cutting device for cutting a jacket of a jacketed optical fiber, a terminal portion of the jacketed optical fiber is grasped at two portions thereof by a pair of clamps each having a V-shaped groove, and a pair of blades having concave half circle-shaped edges opposite to each other are applied to a portion between the grasped portions of the jacketed optical fiber to transversally cut the jacket layer into a form of an annulation. This type of conventional cutting tool is disadvantageous in that the engagement of the edges is not satisfactorily accurate, and sometimes the surface of the base optical fiber is damaged.

Accordingly, there is a strong demand for a cutting method and apparatus capable of accurately cutting the jacket layer of the jacketed optical fiber without damaging the base optical fiber.

SUMMARY OF THE INVENTION

An object of the present invention is to provide a cutting method and apparatus for removing a jacket layer from a jacketed optical fiber without damaging a base optical fiber thereof.

Another object of the present invention is to provide a cutting method and apparatus for removing a jacket coating layer from a jacketed optical fiber by easy operation with a high degree of accuracy and high reproducibility.

The above-mentioned objects can be attained by the cutting method and apparatus of the present invention.

The cutting method of the present invention for removing a jacket layer from a jacketed optical fiber, comprises the steps of:

(A) straightening a terminal portion of a jacketed optical fiber comprising a base optical fiber, a primary coating layer covering the base optical fiber and a secondary coating layer covering the primary coating layer;

(B) grasping the straightened portion of the jacketed optical fiber at at least two portions thereof spaced from each other;

(C) arranging, beside the straightened portion of the jacketed optical fiber, a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber extends at a substantially right angle thereto, and a center line of the gap between the pair of cutting edges intersects the straight axis of the straightened portion of the jacketed optical fiber; and (D) cutting the jacket layer of the straight portion of the jacketed optical fiber at a depth equal to or larger than the thickness of the secondary coating layer but smaller than the total of the thicknesses of the primary and secondary coating layers, by moving the pair of cutting blades of the cutting device in at least one transversal direction at a substantially right angle relative to the straight axis of the straightened portion of the jacketed optical fiber.

The cutting apparatus of the present invention for removing a jacket layer from a jacketed optical fiber, comprises:

(A) a holder for holding a terminal portion of a jacketed optical fiber comprising a base optical fiber, a primary coating layer covering the base optical fiber and a secondary coating layer covering the primary coating layer, the jacketed optical fiber holder having a pair of clamps for grasping the terminal portion of the jacketed optical fiber, spaced from each other to leave a space therebetween through which space a terminal portion of the jacketed optical fiber extends in a straightened form; and (B) a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber held by the jacketed optical fiber holder extends at a substantially right angle thereto, and a center line of the gap between the pair of cutting edges intersects the straight axis of the straightened portion of the jacketed optical fiber, the blade device being able to move in a direction at an angle of about 90 degrees to the straight axis of the straightened portion of the jacketed optical fiber.

DESCRIPTION OF THE PREFERRED EMBODIMENTS

Figure 1:
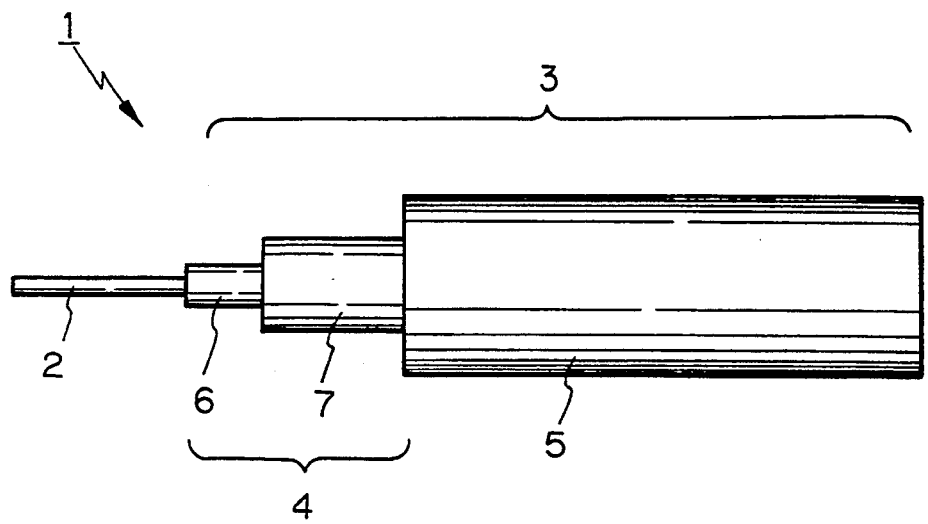
FIG. 1 is an explanatory side view showing a structure of a jacketed optical fiber.

A jacketed optical fiber has a jacketing constitution, for example, as shown in FIG. 1.

Referring to FIG. 1, a jacketed optical fiber 1 is composed of a base optical fiber 2 (main material: quartz) and a jacket layer 3 covering the base optical fiber 2. The jacket layer 3 comprises a primary coating layer 4 covering the base optical fiber 2 and a secondary coating layer 5 covering the primary coating layer 4. The primary coating layer 4 comprises a cladding layer 6 directly covering the naked optical fiber core 2 and a buffer layer 7 covering the cladding layer 6.

Figure 2:
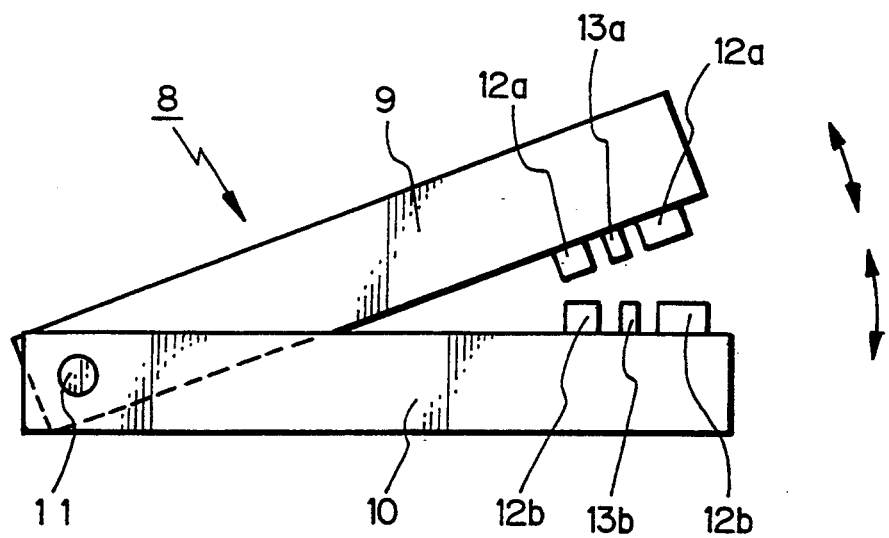
FIG. 2 is an explanatory front view of a conventional cutting tool for a jacket layer of a jacketed optical fiber.

FIG. 2 shows a side view of a typical conventional cutting tool for transversely cutting a jacket layer of a jacketed optical fiber. In FIG. 2, a cutting tool 8 is provided with a pair of pushing arms 9 and 10 joined to each other with a pivot 11 and rotatable around the pivot 11 in the directions as shown by arrows. The pushing arms 9 and 10 are provided with two pairs of clamps 12a and 12b located at end portions thereof for grasping a terminal portion of a jacketed optical fiber (not shown). The clamps 12a and 12b are provided with grooves with a V-shaped cross sectional profile (not shown) for receiving the terminal portion of the jacketed optical fiber (not shown). Between the clamps 12a and 12b, a pair of cutting blades 13a and 13b are arranged. Each of the blades 13a and 13b has an inwardly concave half circle-shaped edge (not shown in FIG. 2).

When the pushing arms of the cutting tool are pushed opposite to each other, the terminal portion of the jacketed optical fiber is grasped by the two pairs of clamps and the jacket layer of the grasped jacketed optical fiber is cut by the pair of inwardly concaved half circle-shaped edges into an annular form.

The conventional cutting tool as shown in FIG. 2 has a simple constitution and thus a low price, and can be easily operated. This type of conventional cutting tool is, however, disadvantageous in that the precise working accuracy of the half circle-shaped edges is slightly variable, the engagement mechanism of the half circle-shaped edges is not always stable and precise and thus the performance accuracy of the cutting tool gradually lowers during the practical use thereof.

Figure 3A:
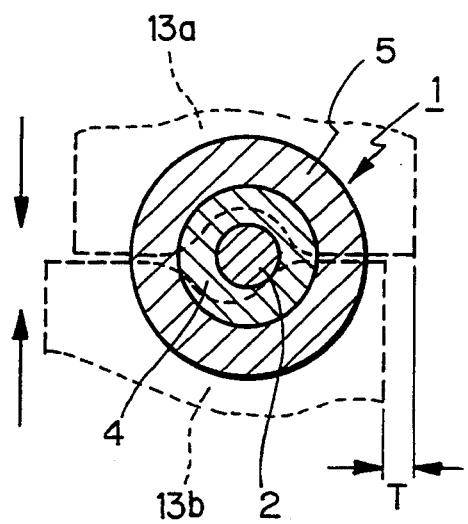
FIG. 3(A) is an explanatory cross-sectional view of an example of a jacketed optical fiber cut by a conventional cutting tool.
Figure 3B:
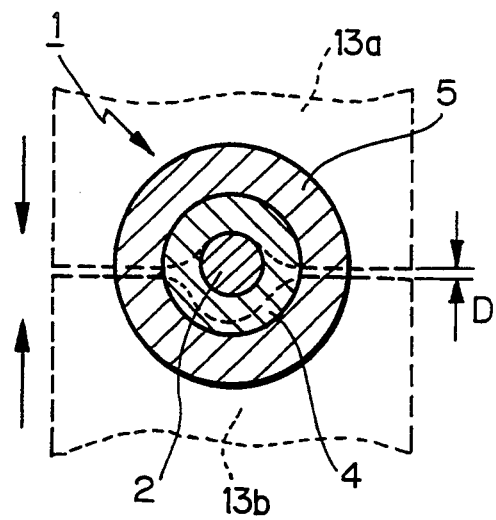
FIG. 3(B) is an explanatory cross-sectional view of another example of a jacketed optical fiber cut by the conventional cutting tool.
Figure 3C:
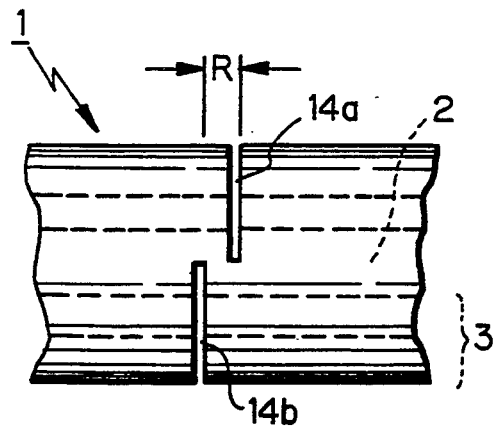
FIG. 3(C) is an explanatory side view of another example of a jacketed optical fiber.

When the conventional cutting tool is used, a jacket layer of a jacketed optical fiber is sometimes irregularly cut, for example, as shown in FIGS. 3(A), 3(B) and 3(C).

In FIG. 3(A), when upper and lower edges 13a and 13b cut into a jacket layer of a jacketed optical fiber 1, the lower edge 13b takes an irregular position moved by a distance T from a regular position thereof in a horizontal direction. In this case, the lower edge comes into contact with and damages the surface of the base optical fiber 2. This phenomenon occurs when the shape and dimensions of the edges are not satisfactorily precise and the engagement of the upper and lower edges are not accurate.

Also, the inaccuracy is promoted during the practical use of the tool.

In FIG. 3(B), when the upper and lower edges 13a and 13b are engaged, the upper edge takes an irregular position moved by a distance D from a regular position thereof in the vertical direction. In this case, the upper edge 13a comes into contact with and damages the surface of the base optical fiber 2.

In FIG. 3(C), when a jacket layer 3 of a jacketed optical fiber 1 is cut by a pair of upper and lower edges (not shown), the resultant upper and lower cuts 14a and 14b are slide away from each other by a distance R in the longitudinal direction of the jacketed optical fiber 1. In this case, the jacket layer 3 is not cut in an annular form and thus a resultant jacket-removed product is an inferior product. If the jacket layer 3 is forcibly drawn out from the jacketed optical fiber 1, sometimes the base optical fiber is damaged or broken.

Usually, the irregular cuttings as shown in FIGS. 3(A), 3(B) and 3(C) occur in combinations of two or more thereof and thus the practical cutting results are very complicated. The reasons for the irregular cutting phenomena are as follows.

(1) The small inwardly concave half circle-shaped edges which are difficult to be precisely worked are used to cut the jacket layer of the jacketed optical fiber.

(2) The pushing mechanism of the cutting tool is too simple and thus the cutting operation exhibits a poor accuracy and stability.

(3) In the clamp mechanism of the cutting tool for grasping the jacketed optical fiber, there is no means for positively straightening and holding the terminal portion of the jacketed optical fiber between the clamps having the V-shaped cross-sectional grooves.

When a secondary coating layer with a length of about 10 cm of a jacketed optical fiber is transversely cut by the conventional cutting tool and then drawn out from the fiber, a force necessary for drawing out the coating layer varies within a large range of from about 0.7 to about 1.8 kg. Also, the cut end face of the remaining jacket layer is significantly uneven. This phenomenon shows that the cut face made by the conventional cutting tool is not precise. Also, this imprecise cut is derived from a poor precision in form and dimensions of the inwardly concave half circle-shaped edges and from an inaccurate engagement of the cutting edges.

Also, when the base optical fibers exposed to the outside by removing the jacket layers by using the conventional cutting tool are subject to a flexural breaking test, about 40% of the tested base optical fibers are broken at portions at which the jacket layers are cut by the conventional cutting tool. This means that a large number of the base optical fiber surfaces are damaged by the conventional cutting tool.

The cutting method and apparatus of the present invention can precisely cut a secondary coating layer of a jacketed optical fiber in a direction of about 10 degrees to the longitudinal axis of the jacketed optical fiber, without damaging a base optical fiber thereof.

The cutting method the present invention for removing a jacket layer from a jacketed optical fiber, comprises:

(A) straightening a terminal portion of a jacketed optical fiber comprising a base optical fiber, a primary coating layer covering the base optical fiber and a secondary coating layer covering the primary coating layer;

(B) grasping the straightened portion of the jacketed optical fiber at at least two portions thereof spaced from each other;

(C) arranging, beside the straightened portion of the jacketed optical fiber, a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber extends at a substantially right angle thereto, and a center line of the gap between the pair of cutting edges intersects the straight axis of the straightened portion of the jacketed optical fiber; and (D) cutting the jacket layer of the straight portion of the jacketed optical fiber at a depth equal to or larger than the thickness of the secondary coating layer but smaller than the total of the thicknesses of the primary and secondary coating layers, by moving the pair of cutting blades of the cutting device in at least one direction at a substantially right angle relative to the straight axis of the straightened portion of the jacketed optical fiber.

The cutting apparatus of the present invention for removing a jacket layer from a jacketed optical fiber, further comprises:

(A) a holder for holding a terminal portion of a jacketed optical fiber comprising a base optical fiber, a primary coating layer covering the base optical fiber and a secondary coating layer covering the primary coating layer, the jacketed optical fiber holder having a pair of clamps for grasping the terminal portion of the jacketed optical fiber, spaced from each other to leave a space therebetween through which space a terminal portion of the jacketed optical fiber extends in a straightened form; and (B) a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber held by the jacketed optical fiber holder extends at a substantially right angle thereto, and a center line of the gap between the pair of cutting edges intersects the straight axis of the straightened portion of the jacketed optical fiber, the blade device being able to move in a direction at an angle of about 90 degrees to the straight axis of the straightened portion of the jacketed optical fiber.

An embodiment of the cutting apparatus of the present invention for removing the jacket layer from a jacketed optical fiber, is provided with a blade device comprising a pair of cutting blades for cutting the jacket layer and a holder for fix-holding the cutting blades, the cutting blades having at least one pair of straight cutting edges arranged opposite to each other through a gap left therebetween and on one and the same plane. The gap has a specific width between the cutting edges as mentioned hereinafter.

In the above-mentioned embodiment of the cutting apparatus of the present invention, the cutting blades are optionally provided with a pair of first straight edges opposite to each other through a first gap left therebetween and on one and the same plane and a pair of second straight edges opposite to each other through a second gap left therebetween and different in distance from the first gap, and on one and the same plane as mentioned above.

The embodiment of the cutting apparatus of the present invention is provided with a holder for holding a terminal portion of a jacketed optical fiber, having a pair of clamps for grasping the terminal portion of the jacketed optical fiber, spaced from each other to leave a space therebetween through which space a terminal portion of the jacketed optical fiber extends in a straightened This embodiment of the cutting apparatus of the present invention is optionally further provided with means for moving or turning the blade device in a predetermined direction, and/or means for turning the straightened terminal portion of the jacketed optical fiber around a longitudinal straight axis of the terminal portion.

In an embodiment of the cutting method of the present invention, in the blade device, the cutting blades are fixed to the blade holder and arranged in such a manner that the pair of cutting edges of the cutting blades extend in parallel to each other and the gap between the cutting edges has a width equal to or smaller than the outside diameter of primary coating layer but larger than the diameter of the base optical fiber, and the blade device is moved toward the straightened portion of the jacketed optical fiber in a direction in which the center line of the gap between the pair of cutting edges intersects the straight axis of the straightened portion of the jacketed fiber.

In the cutting method of the present invention, the cutting operation is optionally applied twice or more to the jacket layer of the straightened portion of the jacketed optical fiber in two different directions from each other, preferably at a substantially right angle to each other.

In an embodiment of the above-mentioned two cutting, operations, the jacket layer of the straightened portion of the jacketed optical fiber is firstly cut by moving the cutting blades in a direction at a substantially right angle to the straight axis of the straightened portion of the jacketed optical fiber, the cutting blades are withdrawn from the first cut jacketed optical fiber, the first cut straightened portion of the jacketed optical fiber is turned around the straight axis thereof at an angle of about 90 degrees, and then the jacket layer of the turned straightened portion of the jacketed optical fiber is secondly cut by moving the cutting blades in a direction at a substantially right angle to the straight axis of the turned straightened portion of the jacketed optical fiber.

In another embodiment of the twice cutting operations, the jacket layer of the straightened portion of the jacketed optical fiber is firstly cut by moving the blade device in a first direction at a substantially right angle to the straight axis of the straightened portion of the jacketed optical fiber, and after the blade device is withdrawn from the jacketed optical fiber and turned around the straight axis of the straightened portion of the jacketed optical fiber at an angle of about 90 degrees, a second cut is made by moving the turned cutting device in a second direction at a substantially right angle to the first direction and to the straight axis of the straightened portion of the optical fiber.

In another embodiment of the twice cutting operations, the jacket layer of the straightened portion of the jacketed optical fiber is firstly cut by moving the blade device in a direction at a substantially right angle to the straight axis of the straightened portion of the jacketed optical fiber, and then a second cut is made by turning the blade device around the straight axis of the first cut straightened portion of the jacketed optical fiber at an angle of 90 degrees or more.

In an embodiment of the cutting apparatus for carrying out the cutting method of the present invention, the blade device is joined with means for guiding the blade device to allow the cutting blades to move toward the straightened portion of the jacketed optical fiber in a direction at a substantially right angle to the straight axis of the straightened portion of the jacketed optical fiber extending through the jacketed optical fiber-holding space.

Optionally, the blade device is joined with means for turning the blade device around the straight axis of the straightened portion of the jacketed optical fiber extending through the jacketed optical fiber-holding space.

In an embodiment of the cutting blades usable for the present invention, the straight cutting edges are in parallel to each other, and the width of the gap between the straight cutting edge is equal to or smaller than the outside diameter of the primary layer but larger than the diameter of the base optical fiber.

In an embodiment of the cutting apparatus of the present invention, the jacketed optical fiber-holder is further provided with means for turning the straightened portion of the jacketed optical fiber around the straight axis of the straightened portion of the jacketed optical fiber extending through the jacketed optical fiber-holding space.

In above-mentioned embodiments of the cutting method and apparatus of the present invention, the following features are important.

(1) The cutting blades have straight cutting edges.
(2) The blade device is provided with a pair of straight cutting edges opposite to each other and spaced from each other through a gap left therebetween, and the gap width (distance) is established in consideration of the thickness of the secondary coating layer to be cut and the diameter of the base optical fiber of the jacketed optical fiber.
(3) The pair of cutting blades fixed to the blade holder and having straight cutting edges can stably move upward and downward or frontward and backward in directions of an angle of about 90 degrees to the straight axis of the straightened terminal portion of the jacketed optical fiber, by a stable mechanism.
(4) The straightened terminal portion of the jacketed optical fiber is stably held by a fiber holder and safely cut in a transversal direction with respect to the straight axis of the terminal portion without damaging the base optical fiber surface.
(5) The jacket layer of the jacketed optical fiber can be cut into an annular form around the straight axis of the terminal portion thereof in a direction at a substantially right angle relative to the straight axis.

Figure 4:
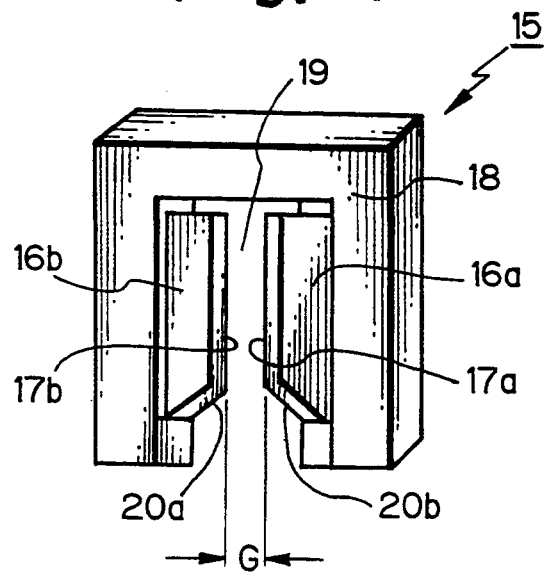
FIG. 4 shows an embodiment of a blade device usable for the present invention.

FIG. 4 shows an embodiment of the blade device usable for the cutting method and apparatus of the present invention.

In FIG. 4, a blade device 15 comprises a pair of cutting blades 16a and 16b having straight cutting edges 17a and 17b and a blade holder 18 by which the cutting blades 16a and 16b are fixed and held. The straight cutting edges 17a and 17b are arranged opposite to each other through a gap 19 having a width G corresponding to a cutting thickness of a jacketed optical fiber (not shown in FIG. 4). The cutting edges 17a and 17b extend in parallel to each other and are arranged on one and the same plane.

Also, the cutting edges 17a and 17b optionally have additional cutting edges 20a and 20b extended from the lower ends of parallel cutting edges 17a and 17b and getting farther away from each other at the ends thereof.

The gap width G between the parallel cutting edges 17a and 17b is equal to or smaller than the outside diameter of the primary coating layer but larger than the diameter of the base optical fiber of the jacketed optical fiber.

Figure 5A:
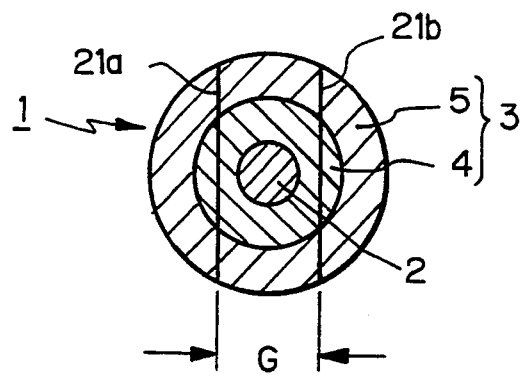
FIG. 5(A) shows an explanatory cross-sectional view of a jacketed optical fiber in which a jacket layer is cut by the blade device of FIG. 4.

When the blade device is arranged beside a straightened terminal portion of a jacketed optical fiber grasped by a fiber holder, in such a manner that a center line (not shown) of the gap between the parallel cutting edges intersects the straight axis of the straightened portion at an angle of about 90 degrees, and is then moved along the center line, the jacket layer of the straightened terminal portion is cut by the blades, as shown in FIG. 5(A).

In FIG. 5(A), two portions of the jacket layer 3, located outside of the cutting lines 21a and 21b are cut by the cutting blades.

The cutting lines 21a and 21b, which are in parallel to each other, correspond to the cutting edges 17a and 17b and the distance G between the cutting lines 21a and 21b is equal to the gap width between the straight cutting edges 17a and 17b.

Figure 5B:
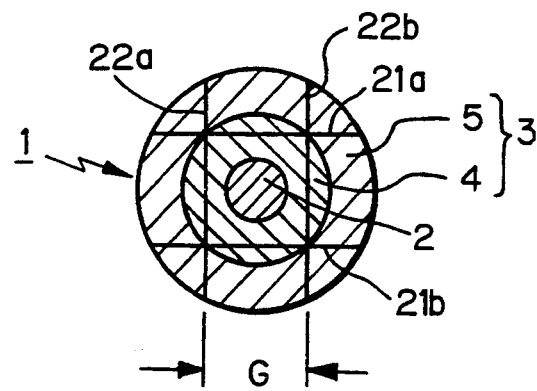
FIG. 5(B) shows an explanatory cross-sectional view of a jacketed optical fiber in which a jacket layer is cut twice by the blade device of FIG. 4.

The cut terminal portion of the jacketed optical fiber is turned around a straight axis of thereof at an angle of about 90 degrees, and the same cutting operation is applied to the turned terminal portion as shown in FIG. 5B. The portions of the jacket layer 3 located outside the cutting lines 22a and 22b are cut by the cutting blades. The distance G between the cutting lines 22a and 22b is equal to the gap width of the parallel cutting edges 17a and 17b. Accordingly, as shown in FIG. 5(B), the secondary layer 5 of the jacketed optical fiber 1 is completely cut in the direction of a substantially right angle with respect to the straight axis of the terminal portion of the jacketed optical fiber 1, and thus can be removed by drawing it away from the jacketed optical fiber.

In another embodiment, the blade device is turned around the straight axis of the straightened terminal portion at an angle of approximately 90 degrees, and the same cutting operation is applied to the straightened terminal portion by the turned blade device.

If necessary, the gap between the cutting edges is adjusted so that the gap width G is equal to or larger than the outside diameter of the primary coating layer. In this case, only the secondary coating layer is cut without cutting the primary coating layer (cladding layer and buffer layer).

Figure 6A:
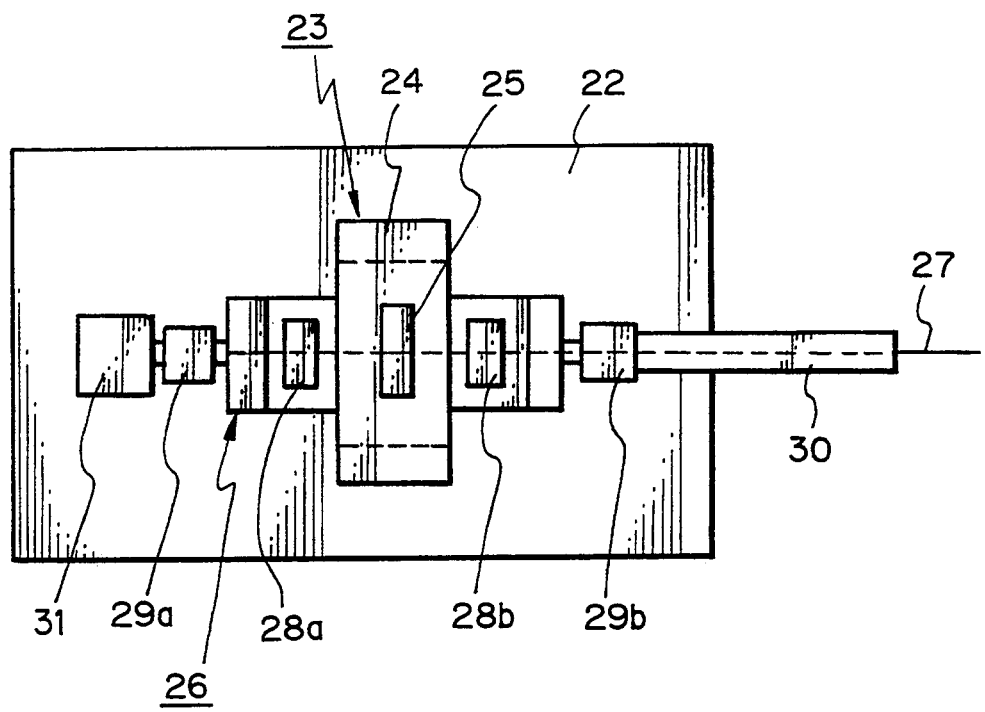
FIG. 6(A) shows a plane view of an embodiment of the cutting apparatus of the present invention.
Figure 6B:
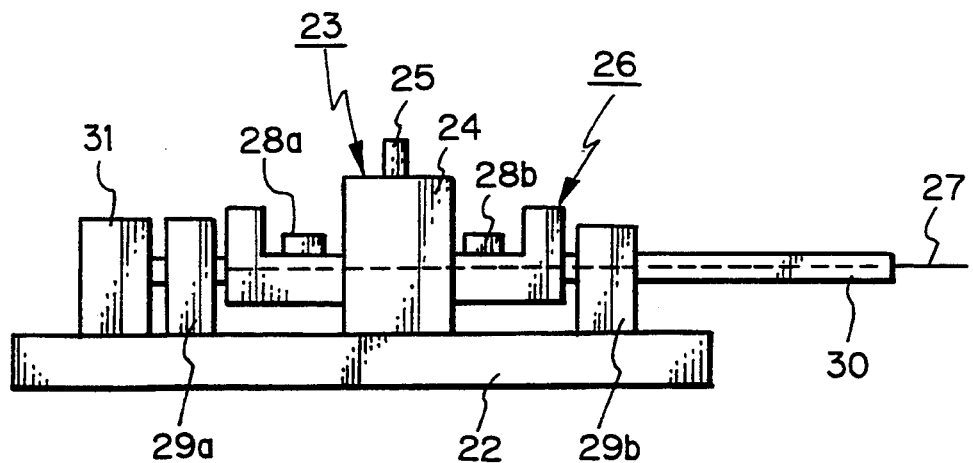
FIG. 6(B) shows a front view of the cutting apparatus of FIG. 6(A)

FIGS. 6(A) and 6(B) show an explanatory plane view and an explanatory front view of an embodiment of the cutting apparatus of the present invention respectively.

In FIGS. 6(A) and 6(B), several elements are arranged on a base plate 22. Namely, a blade device 23 is provided with a blade holder 24 and cutting blade 25 fixed to the blade holder. A holder 26 for holding a terminal portion of a jacketed optical fiber is arranged so that the terminal portion extends through the blade device 23 in a direction of a substantially right angle to the cutting blade 25. The fiber holder 26 is provided with a pair of champs 28a and 28b for grasping the terminal portion of the jacketed optical fiber 27 in a straightened form. The clamps 28a and 28b are located at both sides of the blade device 23.

The fiber holder 26 is supported by a pair of bearings 29a and 29b. The terminal portion of the jacketed optical fiber 27 in the straightened form is inserted into the fiber holder 26 through a fiber guide 30 and firmly held of the clamps 28a and 28b. The fiber holder 26 supported by the bearings 29a and 29b are able to turn around a straight axis of the inserted terminal portion of the jacketed optical fiber 27. The fiber holder is turned by rotation-driving means 31. Namely, the straightened terminal portion of the jacketed optical fiber 27 grasped by the clamps 28a and 28b of the fiber holder 26 can be turned around the straight axis thereof at a desired angle by driving the rotation-driving means 31. In this apparatus, the blade device 23 is fixed on the base plate 22 and does not turn.

Alternatively, the fiber holder 23 is nonrotatably fixed on the base plate 22, and the blade device 23 is able to turn around the straight axis of the terminal portion of the jacketed optical fiber grasped by the fiber holder 26.

When a jacket layer of a terminal portion of a jacketed optical fiber is cut by using the cutting apparatus as shown in FIGS. 6(A) and 6(B), a straightened terminal portion of the jacketed optical fiber 27 is inserted into the fiber holder 26 through the fiber guide 30 and grasped by the clamps 28a and 28b. The blade device 23 is moved downward at an angle of about 90 degrees to the straight axis of the inserted terminal portion of the jacketed optical fiber 27 so that a first cut is applied to the secondary layer of the terminal portion. Then the blade device 23 is withdrawn from the jacketed optical fiber and returned to the original position thereof.

The rotation driving means 31 is driven so as to turn the terminal portion of the jacketed optical fiber 27 at a desired angle, for example, 45 degrees, and a second cut is applied to the turned terminal portion of the jacketed optical fiber 27 in the same manner as mentioned above. The above-mentioned operations are repeated so that the jacket layer is cut into a substantially annular form. Then the clamps 28a and 28b are released, and the terminal portion of the jacketed optical fiber 27 is taken out from the fiber holder 26. Then, the cut jacket layer (secondary coating layer) is drawn out from the jacketed optical fiber by using an appropriate drawing out tool.

Figure 7:
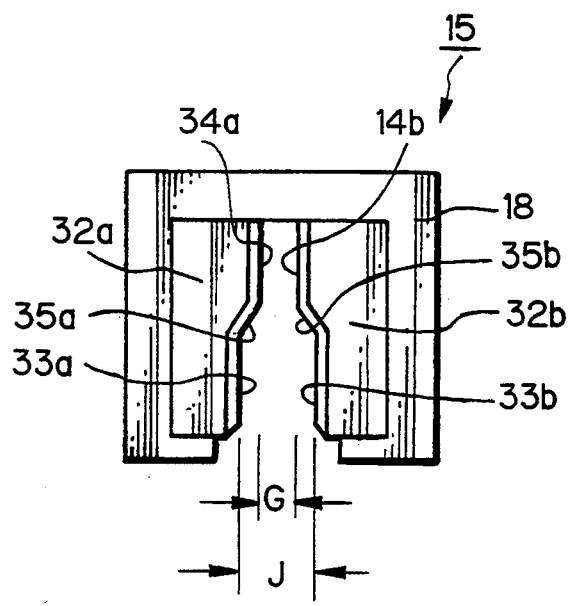
FIG. 7 shows a front view of another embodiment of the blade device usable for the present invention.

In FIG. 7, a blade device 15 comprises a pair of cutting blades 32a and 32b and a blade holder 18. The cutting blades 32a and 32b have first cutting edges 33a and 33b arranged in parallel to each other and spaced from each other with a first gap width J, second cutting edges 34a and 34b arranged in parallel to each other and spaced from each other with a second gap width G smaller than the first gap width J, and inclined edges 35a and 35b through which the first edges 33a and 33b are connected to the second edges 34a and 34b.

Figure 8:
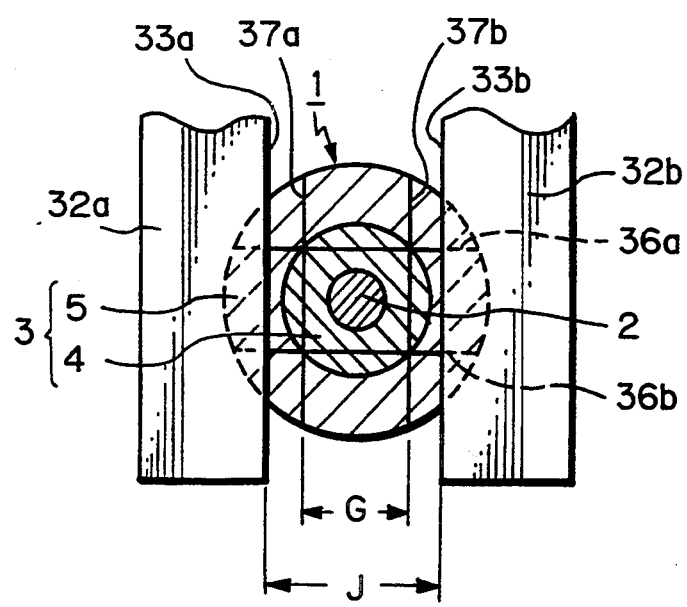
FIG. 8 shows an explanatory cross-sectional view of a jacketed optical fiber cut by the blade device of FIG. 7.

When the blade device as shown in FIG. 7 is used, a jacket layer is cut as shown in FIG. 8.

In a first step, a jacket layer 3 of a terminal portion of a jacketed optical fiber 1 is cut by the blade device 15 as shown in FIG. 7. In a second step, the blade device 15 is withdrawn from the terminal portion, and the cut terminal portion of the fiber is turned around the straight axis of the terminal portion at an angle of 90 degrees. After the second step, the jacket layer 3 is cut to a depth shown by cutting straight lines 36a and 36b. In a third step, the same cutting operation as mentioned above is applied to the turned terminal portion, to cut to a depth shown by a cutting straight lines 37a and 37b. Then in a forth step, the blade device is moved upward to such an extent that the second cutting edges 34a and 34b of the blades 32a and 32b come to the outside of the cut jacket layer 3 and the first cutting edges 33a and 33b remain inside the secondary coating layer 5, and the cut jacket layer is drawn from the jacketed optical fiber so as to remove only the secondary coating layer 5.

In the above-mentioned cutting operation in accordance with the method of the present invention, the terminal portion of the jacketed optical fiber and the blade device move only rectilinearly. Accordingly, no torsional stress is applied to the optical fiber.

Figure 9:
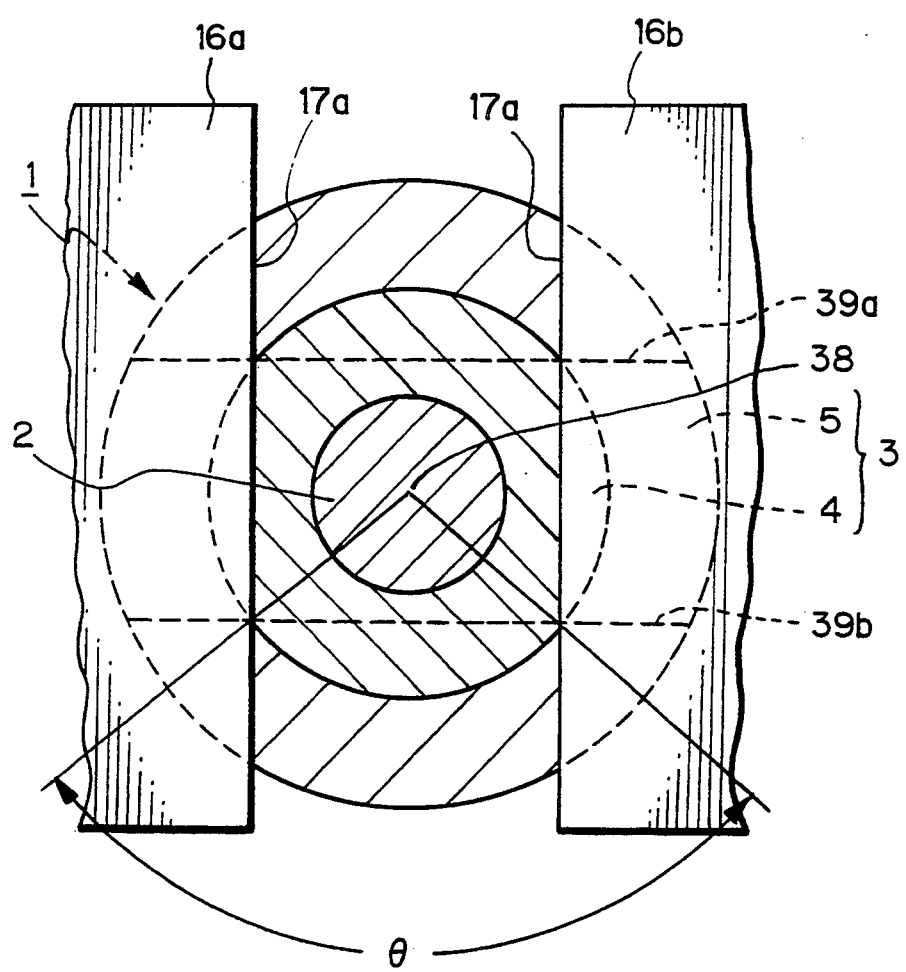
FIG. 9 shows an explanatory cross-sectional view of a jacketed optical fiber in which a jacket layer is cut twice by a blade device of the present invention.

In the cutting method of the present invention, a jacket layer of a jacketed optical fiber can be cut annularly as shown in FIG. 9.

In FIG. 9, a jacket layer 3 of a straightened terminal portion of a jacketed optical fiber 1 is cut by a pair of cutting blades 16a and 16b of a blade device. While remaining in the blades 16a and 16b in the jacket layer 3, the straightened terminal portion or the blade device is turned at an angle $\theta$ around a straight axis 38 of the terminal portion of the jacketed optical fiber 1. Accordingly, the cutting edges 16a and 16b come to the positions indicated by dotted lines 39a and 39b. While continuously cutting, the jacket layer 3 into an annular form. When the turning angle $\theta$ is 90 degrees or more, the jacket layer 3 can be cut into the form of a complete annulation.

Namely, by the method of the present invention, the jacket layer can be cut annularly by rectilinearly moving the blade device and then by turning the straightened terminal portion of the jacketed optical fiber or the blade device around the straight axis of the terminal portion.

The above-mentioned method and apparatus of the present invention exhibit the following advantages.

(1) Since the cutting edges are rectilinear, the production of the cutting blades is easy, and the cutting operation is simple and can be effected with a high degree of accuracy.

(2) Since a pair of cutting edges are arranged opposite to each other, and the gap width between the edges can be adjusted so as to accord with the thickness of the jacket layer, there is no risk of damaging the base optical fiber of the jacketed optical fiber.

(3) It is possible to cut only the secondary coating layer of the jacketed optical fiber by adjusting the gap width between the cutting edges and a cutting angle at which the cutting edges are inserted into the jacket layer.

(4) The cut face of the jacket layer is smooth.

(5) When the base optical fiber prepared by removing the jacket layer is subjected to a flexural break test, no breakage occurs at the jacket layer-cutting point thereof.

(6) The jacket layer-removing procedure can be carried out at a high efficiency by combining a rectilinear motion with a turning motion of the blade device.

In another embodiment of the cutting method and apparatus of the present invention, a specific blade device is employed. In this blade device, the cutting blades are fixed to the blade holder and arranged in such a manner that the pair of cutting edges of the cutting blades get closer to each other at the ends thereof located close to the straightened portion of the jacketed optical fiber and get farther away from each other at the opposite ends thereof located away from the straightened portion of the jacketed optical fiber, the gap between the closer ends of the cutting edges has a width equal to or smaller than the outside diameter of the primary coating layer but larger than the diameter of the base optical fiber.

The blade device is moved toward the straightened portion of the jacketed optical fiber is a direction in which the center line of the gap between the pair of cutting edges intersects the straight axis of the straightened terminal portion of the jacketed optical fiber.

Figure 10:
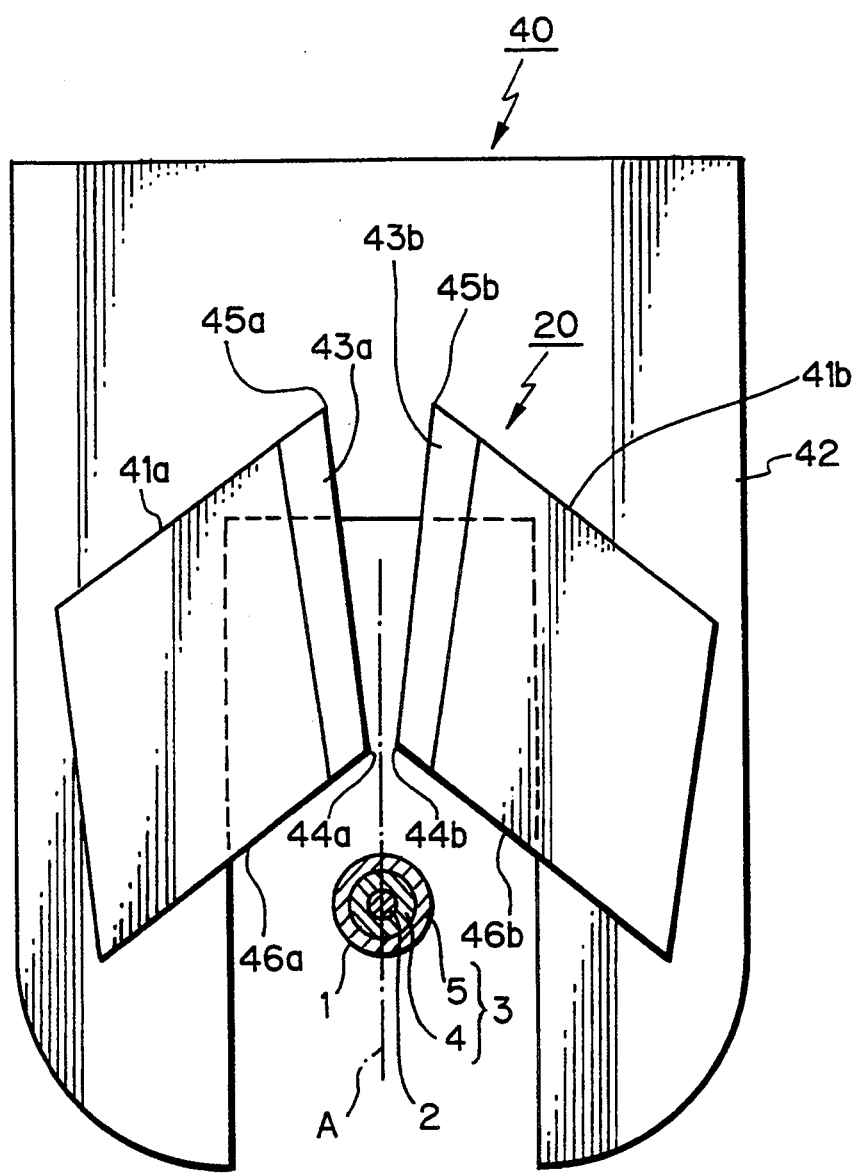
FIG. 10 is an explanatory front view of another embodiment of the blade device usable for the present invention.

Referring to FIG. 10, a blade device 40 comprises a pair of cutting blades 41a and 41b and a blade holder 41 to which the cutting blades are fixed.

In the blade device 40, the cutting blades 41a and 41b are provided with straight cutting edges 43a and 43b which are arranged in such a matter that the lower ends 44a and 44b thereof are spaced from each other through a gap left therebetween and having a smallest width compared with others and the upper ends 45a and 45b are spaced from each other through a gap left therebetween and having a largest width compared with others. Namely the straight cutting edges 43 and 43b are inclined with respect to a center line A of the gap between the cutting edges 43a and 43b.

There is no limitation on the inclination angle of the cutting edges 43a and 43b from the center line A. Usually, the inclination angle is preferably in the range of from 5 to 25 degrees.

The gap width of the lower ends 44a and 44b is equal to or smaller than the outside diameter of the primary coating layer 4 but larger than the diameter of the base optical fiber 2.

In a cutting step, the blade device is arranged in such a manner that the lower (closest) ends 44a and 44b of the cutting edges 43a and 43b take positions close to a straightened terminal portion of a jacketed optical fiber 1, and upper ends 45a and 45b of the cutter edges 43a and 43b take positions farther away from the straightened terminal portion of the jacketed optical fiber 1, and the center line A of the gap between the cutting edges 43a and 43b intersects the straight axis of the straight terminal portion of the jacketed optical fiber, preferably at an angle of about 90 degrees.

In the blade device as shown in FIG. 10, the cutting blades 41a and 42 are optionally provided with additional cutting edges (not shown) formed on other sides 46a and 46b. When the blade device 40 is moved downward, the additional cutting edges formed on the sides 46a and 46b guide the lower (closest) ends 44a and 44b of the cutting edges 43a and 43b toward the jacket layer 3 of the jacketed optical fiber 1 while cutting portions of the jacket layer 3.

Figure 11A:
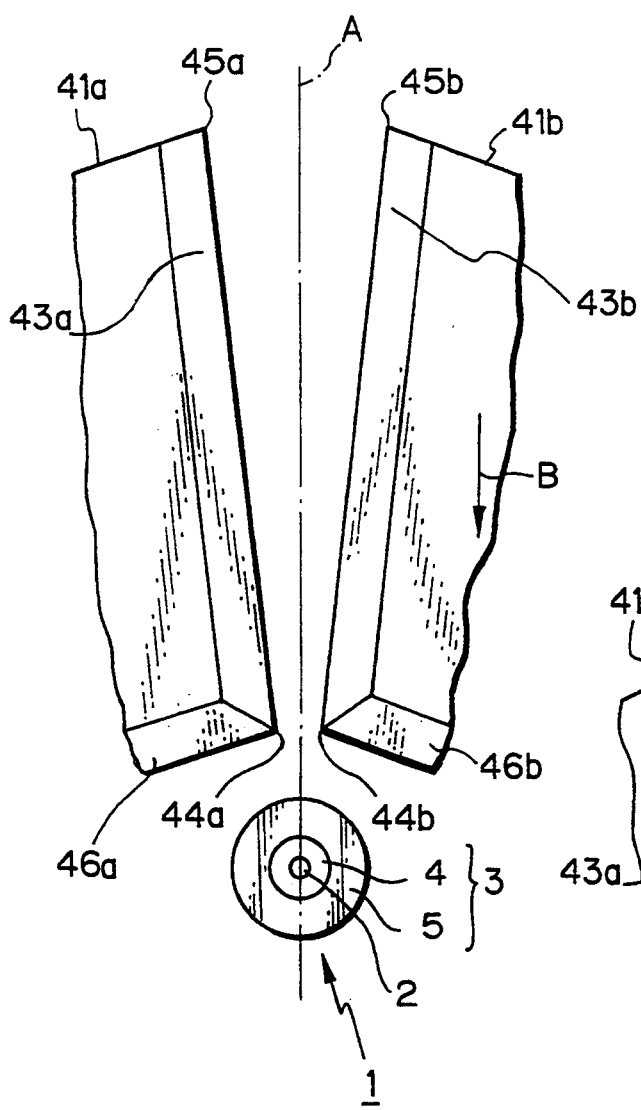
FIG. 11(A) is a view explaining a location of the blade device of FIG. 10 with respect to a jacketed optical fiber before the cutting operation.

In the cutting step by using the blade device as mentioned above, a straightened terminal portion of a jacketed optical fiber i is arranged as shown in FIG. 11(A). The straight axis of the terminal portion intersects the center line A of the gap between the cutting edges 43a and 43b, preferably at an angle of about 90 degrees.

Figure 11B:
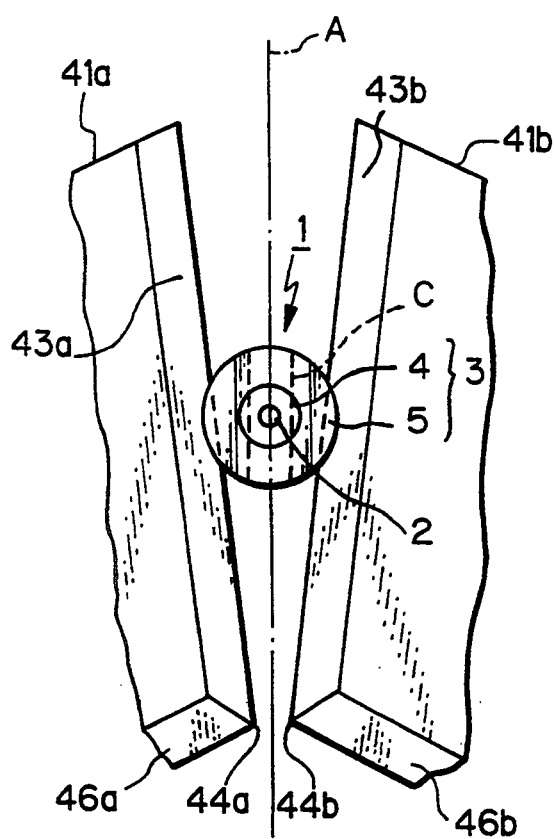
FIG. 11(B) is a view explaining a location of the blade device of FIG. 10 during the cutting operation.

The cutting blades 41a and 41b are moved in the direction as shown by an arrow B. The jacket layer 3 of the terminal portion of the jacketed optical fiber 1 is cut by the lower (closest) ends 44a and 44b of the cutting edges 43a and 44, as shown by dotted lines C in FIG. 11(B).

In this cutting operation, after the jacket layer 3 is cut by the lower (closest) ends 44a and 44b of the cutting edges 43a and 43b into the cutting lines C, the cutting edges 43a and 43b get farther away from the cutting lines C and thus friction between the cutting edges 43a and 43b and the cut surfaces of the jacket layer decreases. Therefore, the cutting blades 41a and 41b can move smoothly.

After the cutting is completed, the blade device is withdrawn from the jacketed optical fiber and returned to the original position thereof.

The secondary coating layer in the cut terminal portion can be drawn out from the jacketed optical fiber, in the above-mentioned manner.

However, the above-mentioned cutting operation cannot completely cut the secondary coating layer and portions of the secondary coating layer between a pair of dotted lines C are left uncut. Therefore, the drawing out operation for the incompletely cut secondary coating layer needs a relatively large force. This problem can be removed by further cutting the jacket layer in a direction different from the first cutting direction.

In the cutting step of the above-mentioned cutting method, the cutting operation is optionally applied twice to the jacket layer of the straightened portion of the jacketed optical fiber in two different directions, preferably at a substantially right angle to each other.

In this cutting operation, cutting operation, the jacket layer of the straightened portion of the jacket optical fiber is firstly cut by moving the blade device in a first direction at a substantially right angle to the straight axis of the straightened portion of the jacketed optical fiber, and after the blade device is withdrawn from the jacketed optical fiber and turned around the straight axis of the straightened portion of the jacketed optical fiber at an angle of about 90 degrees, a second cut is made by moving the blade device in a second direction at a substantially right angle to the first direction and to the straight axis of the straightened portion of the jacketed optical fiber.

The cutting apparatus of the present invention optionally has means for moving the blade device along the center line of the gap left between the cutting edges. The blade device-moving means allows the blade device to move a distance long enough to cut the jacket layer of the jacketed optical fiber and then to be withdrawn from the jacketed optical fiber and to return to the original position thereof.

Also, the cutting apparatus of the present invention is optionally provided with means for turning the blade device around a turning axis which intersects the center line of the gap between the cutting edges at an angle of 90 degrees.

The turning axis consists of the straight line of the terminal portion of the jacketed optical fiber. The location of the turning axis is set forth so that when the blade device is turned around the turning axis, the blade device does not come into contact with the jacketed optical fiber fixed on the turning axis. Namely, the straightened terminal portion of the jacketed optical fiber is held on the turning axis, and the cutting blades are fixed to the blade holder so that the cutting edges are spaced from the straightened terminal portion held on the turning axis.

Figure 12:
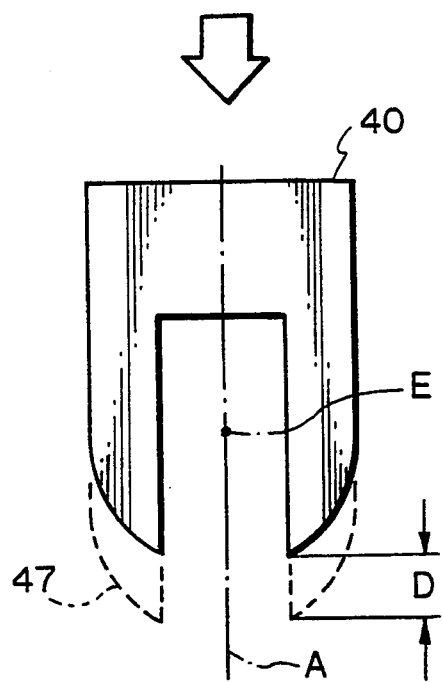
FIG. 12 is an explanatory front view of a movable blade device of the present invention before turning.

Referring to FIG. 12, a blade device 40 in which cutting blades are not shown in this drawing, is located at an original location at which the cutting blades do not come into contact with a jacketed optical fiber (not shown). Then, the blade device 40 is moved downward by a distance D along the center line A until the lower ends of the device 40 reach the locations as shown by dotted lines 47. The straightened terminal portion of the jacketed optical fiber is held on the turning axis E. By the above-mentioned movement, a first cut is applied to the jacket layer of the jacketed optical fiber. Then, the blade device 40 is returned to the original location. At this location, the cutting edges are separated from the jacketed optical fiber.

Figure 13:
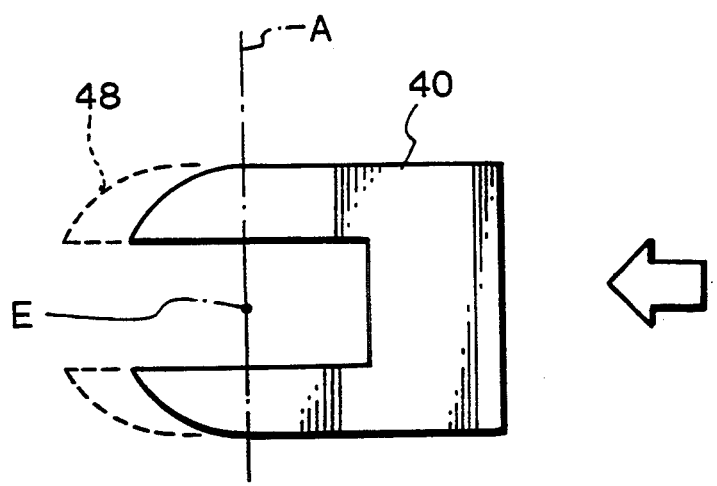
FIG. 13 is an explanatory front view of the movable blade device of the present invention after turning at an angle of 90 degrees.

Then, the blade device 40 is turned around the turning axis E at a desired angle, for example, 90 degrees, as shown in FIG. 13.

The turned blade device 40 is moved in the direction as shown by an arrow in FIG. 13 until the left ends of the device 40 reach the locations as shown by the dotted lines 48, to apply a second cut to the jacket layer of the jacketed optical fiber held on the turning axis E. Thereafter, the blade device 40 is returned to the original location.

By the first and second cutting operations as shown in FIGS. 12 and 13, the jacket layer is cut in two directions.

Figure 14:
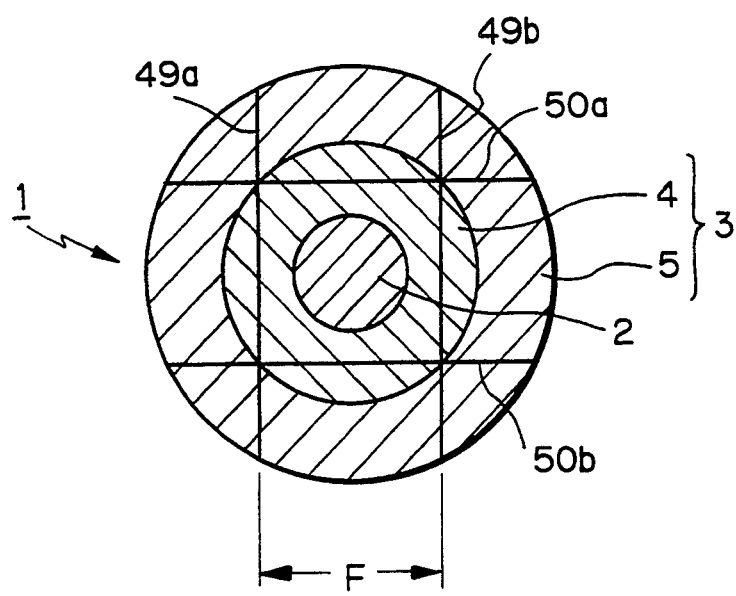
FIG. 14 is an explanatory cross sectional view of an jacketed optical fiber cut by the movable blade device as shown in FIGS. 12 and 13.

Referring to FIG. 14, the jacket layer 3 is cut as shown by cutting lines 49a and 49b and by cutting lines 50a and 50b crossing the cutting lines 49a and 49b, without damaging the base optical fiber 2.

The distance F between the cutting lines 49a and 49b is variable by varying the width of the gap between the closer ends of the cutting edges.

It is possible by the cutting method and apparatus of the present invention to completely cut the secondary coating layer and to partly cut the primary coating layer including the buffer layer, without damaging the base optical fiber. In this case, it is possible to remove only the secondary coating layer from the jacketed optical fiber.

Figure 15A:
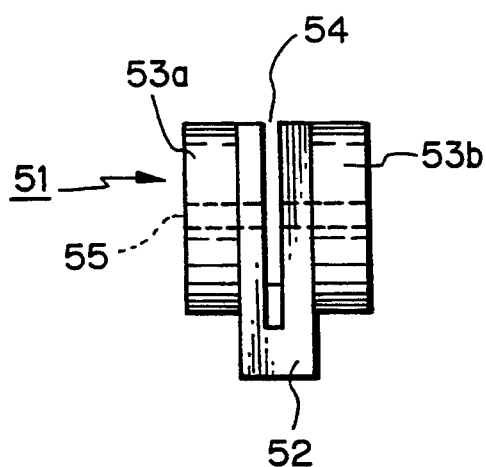
FIG. 15(A) shows an explanatory front view of a support means for a blade device usable for the present invention.
Figure 15B:
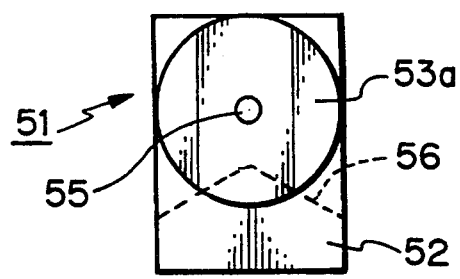
FIG. 15(B) shows an explanatory side view of the support means of FIG. 15(A)

FIGS. 15(A) and 15(B) show an embodiment of support means for supporting the blade device.

FIGS. 15(A) and 15(B) show front and side views of the support means 51, respectively. The support means 51 comprises a middle support member 52 for supporting a blade device (not shown) and a pair of side support shafts 53 for supporting the middle support member 52. The middle support member 52 is provided with a slit 54 in which the blade device (not shown) is held.

The support means 51 has a straight hole 55 extending through the center of the left side support shaft 53a, the middle support members 52, and the center of the right side support shaft 53b. In the straight hole 55, the terminal portion of the jacketed optical fiber (not shown) is held in a straight form. In FIG. 15(B) the dotted bent line 56 shows the lower end of the slit 54.

In the cutting apparatus of the present invention, the blade device is optionally joined with means for guiding the blade device to allow the cutting blade to move toward the straightened portion of the jacketed optical fiber in a direction at a substantially right angle to the straight axis of the straightened portion of the jacketed optical fiber extending through the jacketed optical fiber-holding space.

Figures 16A, 16B:
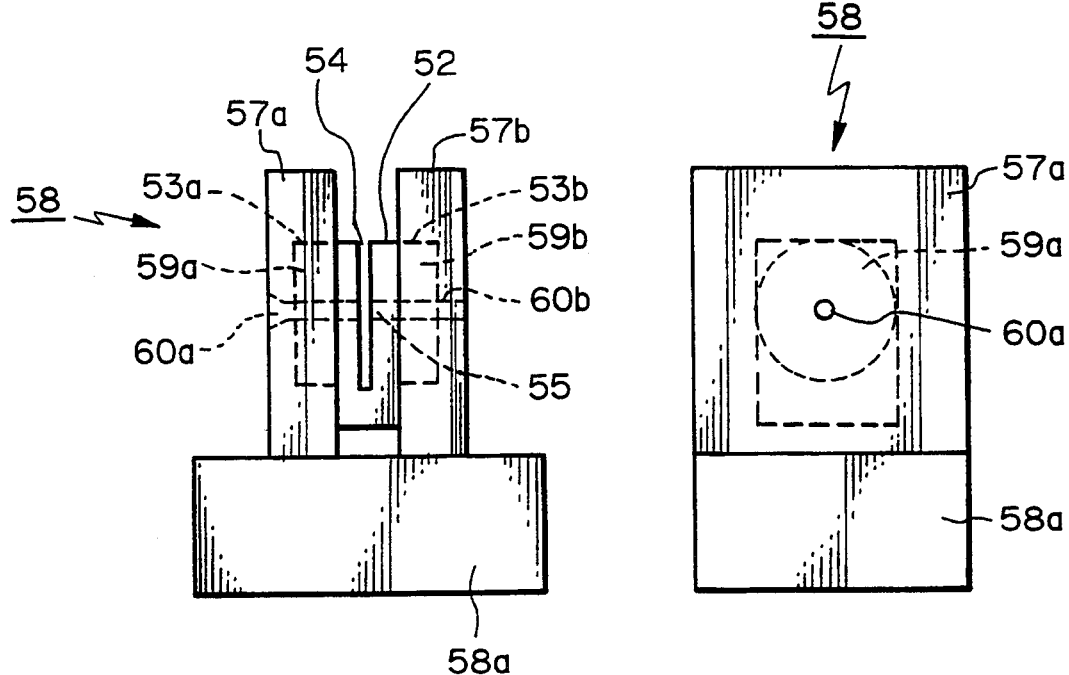
FIG. 16(A) shows an explanatory front view of a stand on which the support means of FIGS. 15(A) and (B) are held.
FIG. 16(B) shows an explanatory side view of the stand of FIG. 16(A)
Figure 16C:
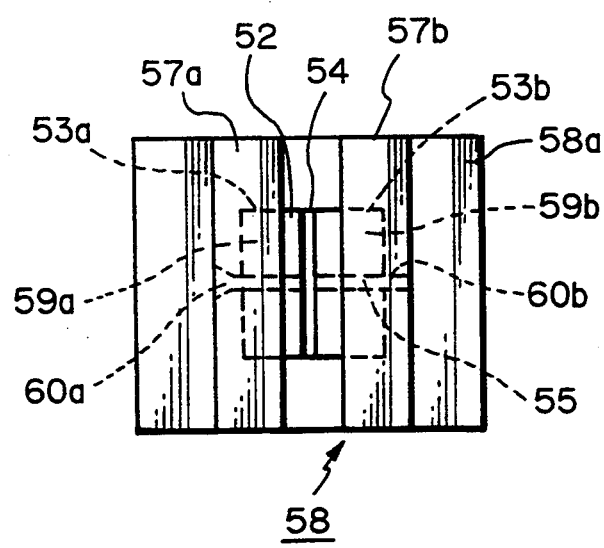
FIG. 16(C) is an explanatory plane view of the stand of FIGS. 16(A) and (B)

FIGS. 16(A), 16(B) and 16(C) show an embodiment of a stand for rotatably holding the blade device support means as mentioned above.

Also, the stand stably guides the movements of the blade device in approaching the jacketed optical fiber and in returning to the original location thereof.

Referring to FIGS. 16(A), 16(B) and 16(C), a stand 58 comprises a base frame 58a and a pair of support plates 57a and 57b spaced from each other and extending upward from the base frame 58a at an angle of 90 degrees. The support plates 57a and 57b have circular concavities 59a and 59b for receiving the side support shafts 53a and 53b of the support means 51 as shown in FIGS. 15(A) and 15(B). The middle support member 52 is interposed between the pair of support plates 57a and 57b and the side support shafts 53a and 53b are rotatably received in the circular concavities 59a and 59b. The support plates 57a and 57b have holes 60a and 60b connected to the straight holes 55 of the blade device support means 51.

Accordingly, when the terminal portion of the jacketed optical fiber is inserted in a straight form into the straight hole 55 of the blade device support means 51 held by the stand 58, and a blade device (not shown) is received by the slit 54 of the middle support member 52, the blade device support means 51 held by the stand 58 is able to turn around the straight axis of the terminal portion of the jacketed optical fiber.

The clamps for grasping the straightened terminal portion of the jacketed optical fiber are arranged at both outer sides of the stand 58. Optionally, a tool for drawing out the cut jacket layer of the jacketed optical fiber is arranged beside the apparatus of the present invention.

The stand 58 is optionally provided with a spring mechanism for returning the blade device to the original location after a cutting operation is completed.

Figure 17:
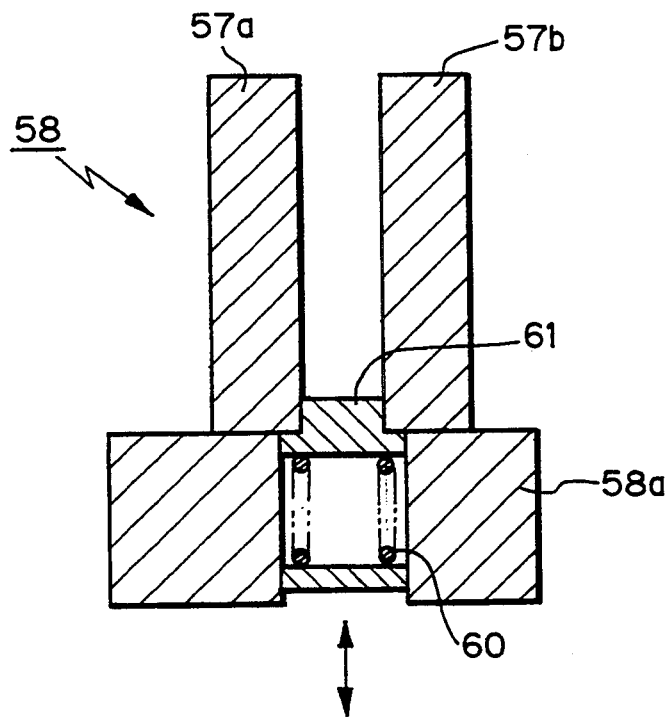
FIG. 17 shows an explanatory cross-sectional front view of another stand for holding the support means.

In FIG. 17, a base frame 58a has a spring 61 and a plate 62 supported by the spring 61. When a blade device is inserted into the slit of the blade device support means, the lower end of the blade device comes into contact with the upper surface of the plate 62. When the blade device is pushed down, the spring 60 is compressed. When the pushing force is released, the blade device is returned to the original location thereof by the returning force of the spring 60.

In another embodiment of the cutting apparatus of the present invention, the jacketed optical fiber-holder is provided with a pillar-shaped member having a straight hole formed therein for holding therein the straightened terminal portion of the jacketed optical fiber, and placed between the pair of clamps. The pillar-shaped member is able to rotate around the center line of the straight hole, and the blade device is located at one end of the pillar-shaped member.

Figure 18:
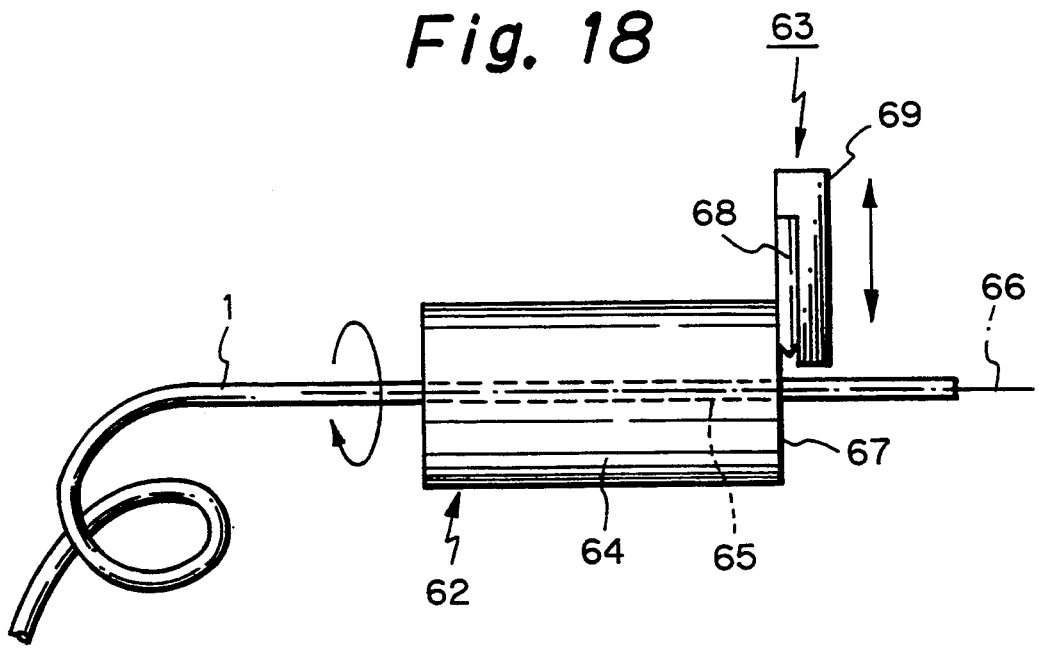
FIG. 18 is an explanatory front view of another embodiment of the cutting apparatus of the present invention.

Referring to FIG. 18, a cutting apparatus for removing a jacket layer from a jacketed optical fiber 1, has a jacketed optical fiber-holder 62 and a blade device 63. The fiber holder 62 comprises a pillar-shaped member 64 having a straight hole 65 formed along the longitudinal axis 66 of the pillar-shaped member 64. When a terminal portion of the jacketed optical fiber 1 is inserted in a straightened form in the straight hole 64, the straight axis of the terminal portion consists of the longitudinal axis 66 of the straight hole 65. The cross-sectional profile of the pillar-shaped member 64 is not limited to a specific form. Preferably, the pillar-shaped member 64 has a circular cross-sectional profile.

The blade device 63 is located on or close to an end face 67 of the pillar-shaped member 64. The blade device 63 is provided with a pair of cutting blades 68, and a blade holder 69.

The pillar-shaped member 64 is able to turn around the longitudinal axis 66 of the straight hole 65, while holding a straightened terminal portion of the jacketed optical fiber 1 in the straight hole 65, at an angle of 90 degrees or more.

The blade device 63 is movable in a direction at a substantially right angle relative to the longitudinal axis of the straight hole 64 as shown by arrows in FIG. 18.

In an embodiment of the cutting method of the present invention by using the cutting apparatus as shown in FIG. 18, a first cutting operation is applied to the jacket layer of the straightened terminal portion of the jacketed optical fiber extending through the straight hole 65 of the pillar-shaped member 65, by moving the blade device 63 downward, and then the blade device 63 is withdrawn upward from the cut jacket layer and returned to the original location thereof.

Then, the pillar-shaped member 4 is turned around the longitudinal axis 66 thereof at a desired angle of, for example, 90 degrees, to cause the straightened terminal portion of the jacketed optical fiber 1 held in the straight hole 65 to be turned at the same angle as mentioned above.

Then, a second cutting operation is applied to the straightened portion of the jacketed optical fiber by moving the blade device 63 in the same manner as in the first cutting operation.

In the above-mentioned method, the jacket layer is cut by a pair of cutting blades 63 in two different directions. Therefore, the cut jacket layer is easily removed from the jacketed optical fiber.

Figure 19:
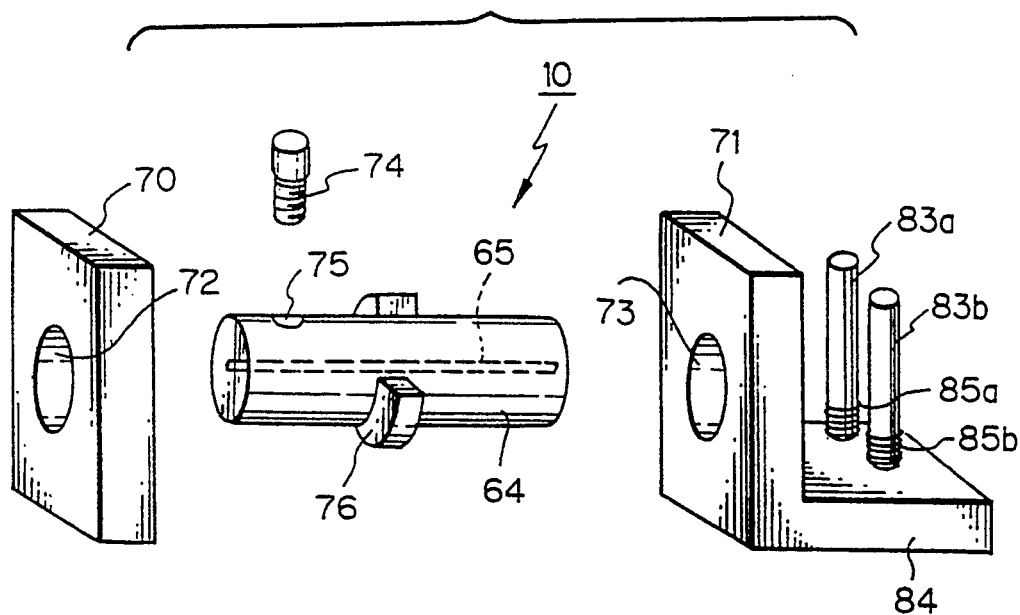
FIG. 19 is an explanatory view of an embodiment of the fiber holder usable for the cutting apparatus of FIG. 18.

In FIG. 19, a pillar-shaped member 64 has a circular cross-sectional profile, and a straight hole 65 is formed on a longitudinal axis of the circular pillar-shaped member 64. The pillar-shaped member 64 is supported at end portions thereof by a pair of supports 70 and 71.

The supports 70 and 71 have circular holes 72 for rotatably receiving the end portions of the pillar-shaped member 64.

When a straight terminal portion of a jacketed optical fiber is inserted into the straight hole 65 of the pillar-shaped member 24, the terminal portion is fixed by inserting at least one screw 74 into tapped hole 76 connected to the straight hole 65.

Alternatively, the terminal portion is fixed to the pillar-shaped member 64 by using clamps fixed to the ends of the pillar-shaped member 76.

The pillar-shaped member 64 is provided with a collar 76 for adjusting a turning angle of the pillar shaped member 64.

When the pillar-shaped member 64 held by the supports 70 and 71, the collar 64 is also used to prevent movement of the member 64 along the longitudinal axis thereof. The collar 76 may be arranged between the supports 70 and 71 or outside of the supports 70 and 71.

Figure 20:
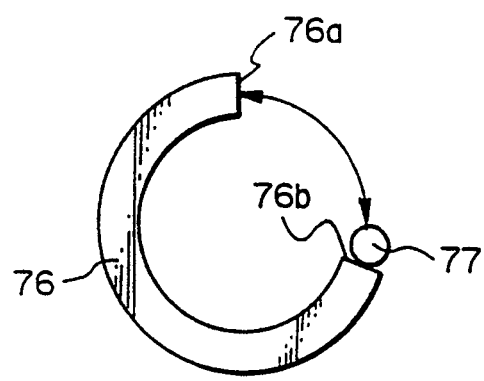
FIG. 20 shows a rotation-controlling collar usable for the fiber holder of FIG. 19.

Referring to FIG. 20, a stopper is provided on a side face of the supports 70 or 71 and comes into contact with ends 76a and 76b of the collar 76. The pillar-shaped member having the collar 76 can change from a state at which the end 76a comes into contact with the stopper 77, to a state at which the end 76b comes into contact with the stopper 77.

Figure 21A:
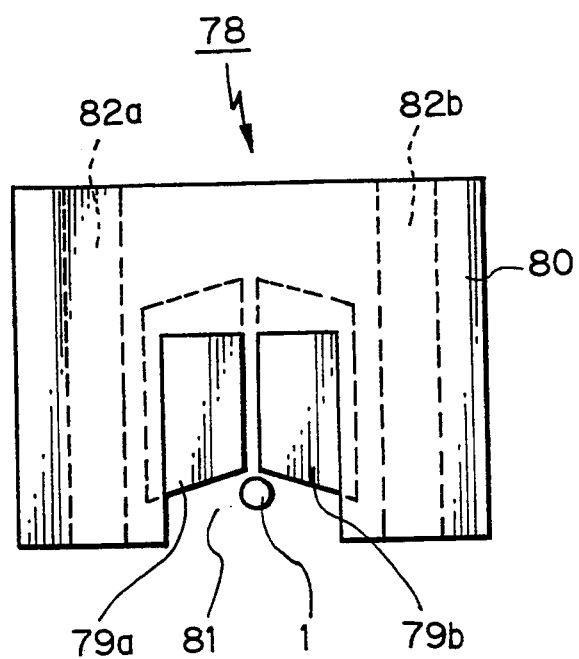
FIG. 21(A) is an explanatory front view of another embodiment of the blade device usable for the cutting device of FIG. 19.
Figure 21B:
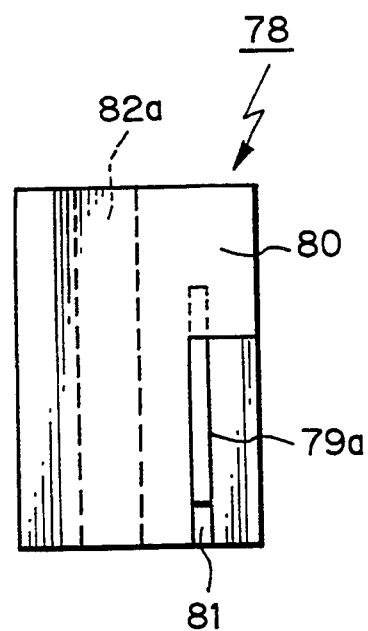
FIG. 21(B) is an explanatory side view of the blade device of FIG. 21(A)

FIGS. 21(A) and 21(B) show an embodiment of a blade device usable for the cutting method and apparatus of the present invention. The blade device 78 shown in FIGS. 21(A) and 21(B) comprises a pair of cutting blades 79a and 79b and a blade holder 80.

The pair of cutting blades 79a and 79b are arranged so as to leave a space 81 below the cutting blades 79a and 79b.

The blade device 78 is located beside an end of the pillar-shaped member 64 as shown in FIGS. 18 and 19, and the terminal portion of the jacketed optical fiber 1 passed through the straight hole 65 of the pillar-shaped member 64 passes through the space 81.

The jacket layer of the terminal portion of the jacketed optical fiber located in the space 81 is cut by moving the blade device 78 downward. Also, the blade device 78 is released from the jacketed optical fiber 1 by moving upward.

The blade holder 80 has a pair of holes 82a and 82b extending in parallel to each other and located outside of the cutting blades 79a and 79b.

Figure 22:
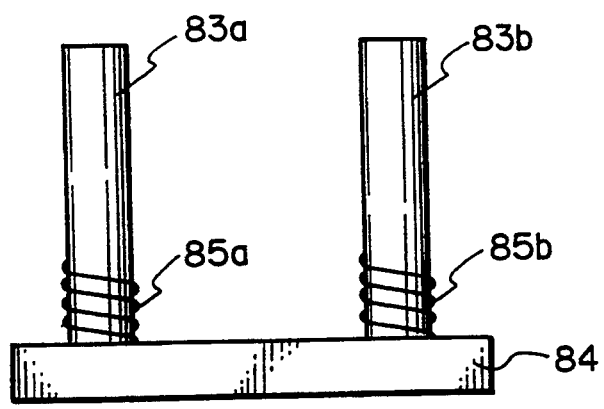
FIG. 22 is an explanatory front view of an embodiment of the stand for holding the blade device of FIGS. 21(A) and (B)

The blade device as shown in FIGS. 21(A) and 21(B) is held by a stand as shown in FIG. 22.

In FIG. 22, a pair of poles 83a and 83b project upward from a base plate 84 and spring 85a and 85b are placed in the lower end portions of the poles 83a and 83b. The poles 83a and 83b are inserted into the holes 82a and 82b of the blade holder 80 shown in FIGS. 21(A) and 21(B).

The blade device 78 engaged with the poles 83a and 83b can move downward by applying a compressing force to the springs 85a and 85b. When the compressing force is released, the springs 85a and 85b can push up the blade device 78.

In FIG. 19, the stand with the poles 83a and 83b is incorporated into the support 71.

In another embodiment of the cutting method of the present invention, the straightened portion of the jacketed optical fiber is placed in the gap between the pair of the cutting edges in such a manner that the straight axis of the straightened portion of the jacketed optical fiber intersects the center line of the gap between the pair of cutting edges at a substantially right angle thereto, and in the cutting step, the cutting blades of the blade device are moved in opposite directions to each other toward the straightened portion of the jacketed optical fiber to such an extent that the jacket layer of the straight portion of the jacketed optical layer is cut at a depth equal to or larger than the thickness of the secondary coating layer but smaller than the total thicknesses of the primary and secondary coating layers.

In the above-mentioned embodiment in the cutting step, optionally the jacket layer of the straightened portion of the jacketed optical fiber is first cut by moving the cutting blades of the blade device in opposite directions to each other toward the straightened portion of the jacketed optical fiber, and then cut again by turning the blade device around the straight axis of the straightened portion of the jacketed optical fiber at an angle of 90 degrees or more.

In the above-mentioned embodiment, the pair of cutting edges of the blade device are preferably arranged in parallel to each other.

In an amendment of the cutting apparatus for carrying out the above-mentioned cutting method, in the blade device, the blade holder comprises a pair of blade-holding poles, the cutting blades are fixed to the blade-holding poles, the cutting edges of the cutting blades are opposite to each other through a gap left therebetween, in which gap the straightened portion of the jacketed optical fiber is held, and the blade-holding poles are able to move in opposite directions to each other toward the center line of the gap.

In the above-mentioned embodiment, the blade device is contained in a pillar-shaped member rotatable around a straight axis of the straightened portion of the jacketed optical fiber extending through the gaps between the cutting edges.

Figure 23:
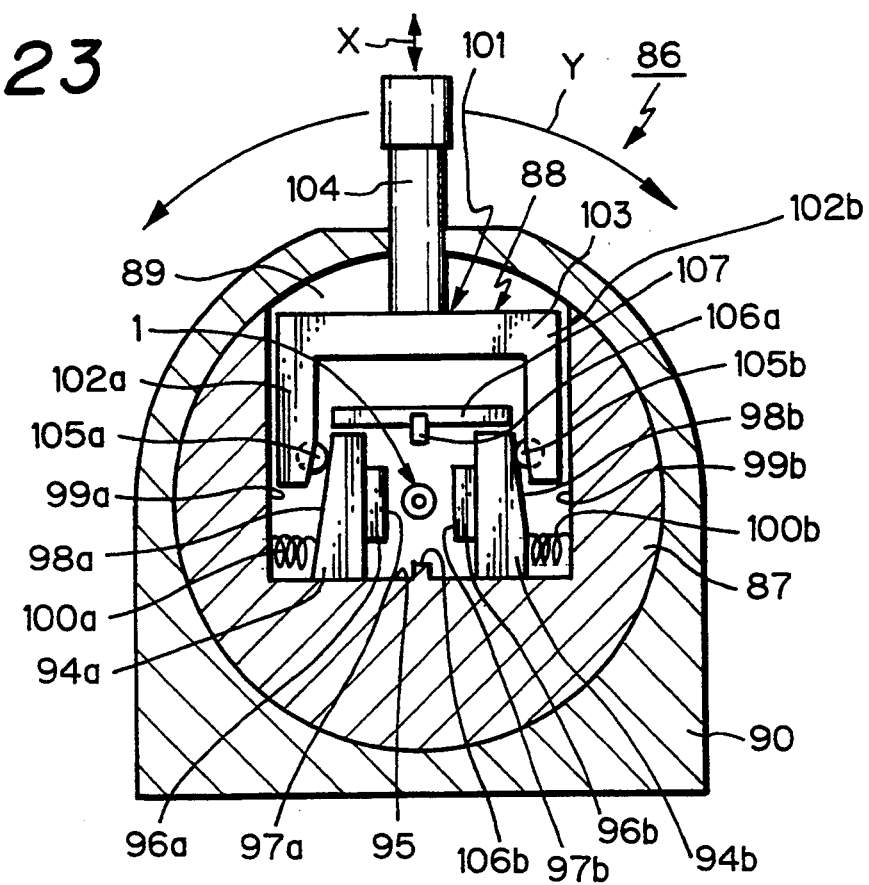
FIG. 23 shows an explanatory cross-sectional view of another embodiment of the blade device of the present invention provided with means for moving and rotating the blade device.

FIG. 23 shows another embodiment of the cutting method and apparatus of the present invention.

In FIG. 23, a cutting device 86 has a pillar-shaped rotatable member 87 and a blade device 88. The pillar-shaped rotatable member 87 is rotatable around a longitudinal axis thereof and is provided with a chamber 89 for receiving the blade device 88. A straightened terminal portion of a jacketed optical fiber 1 extends through the chamber 89, and the straight axis of the straightened terminal portion consists corresponding to the longitudinal axis of the pillar-shaped rotatable member 87.

With respect to the shape and dimensions of the pillar-shaped rotatable member 87, there is no restriction as long as the member 87 can turn around the longitudinal axis thereof. Usually, the pillar-shaped rotatable member 87 preferably has a circular cross-sectional profile.

As shown in FIG. 23, the pillar-shaped rotatable member 87 may be contained in a chamber formed in a container 90. Namely, the member 87 is able to turn around the longitudinal axis thereof within the chamber of the container 90.

Figure 24:
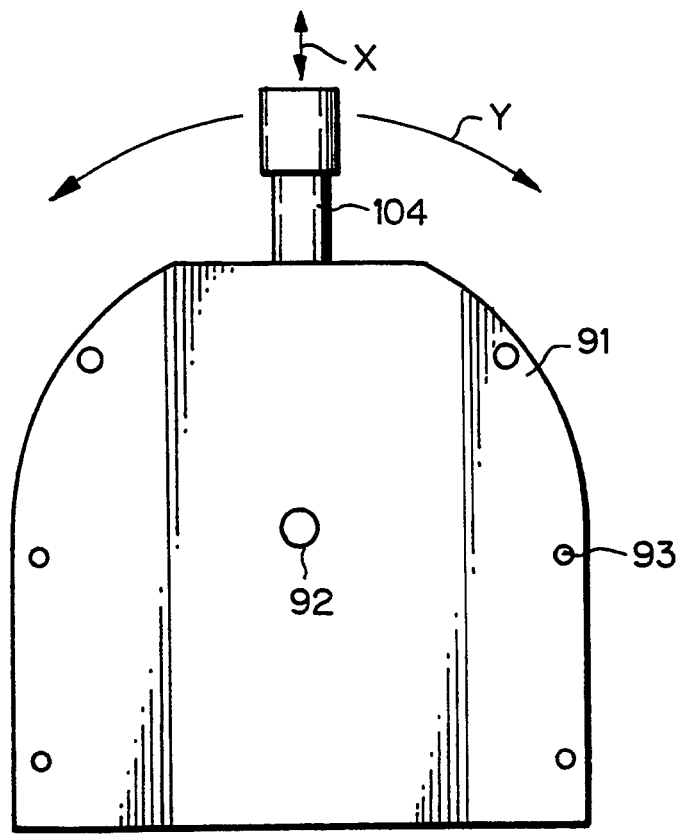
FIG. 24 is an explanatory side view of the embodiment of the blade device of FIG. 23.

The ends of the chamber containing the pillar-shaped rotatable member 87 may be closed as shown in FIG. 24.

In FIG. 24, both the ends of the chamber of the container 90 are closed by a pair of side plates 91. The side plates 91 is provided with guide holes 92 for inserting the straightened terminal portion of the jacketed optical fiber. Namely, the straightened terminal portion is inserted into the chamber 89 of the pillar-shaped rotatable member 88 contained in the container 90 through one of the guide holes 92 and then taken out to the outside of the chamber 89 through the other one of the guide holes 92. The side plates 91 are fixed to the container 90 by a plurality of screws 93.

The blade device 88 is provided with a pair of blade holders 94a and 94b contained in the chamber 89 of the pillar-shaped rotatable member 87.

The blade holders 94a and 94b face opposite to each other through a longitudinal (turning) axis of the pillar-shaped rotatable member 87 which corresponds to the straight axis of the terminal portion of the jacketed optical fiber 1 placed in the chamber 89. Also, the blade holders 94a and 94b are slidable along the bottom face 95 of the chamber 89. A pair of cutting blades 96a and 96b are fixed on the opposing faces of the pair of blade holders 94a and 94b. The cutting blades 96a and 96b have a pair of cutting edges 97a and 97b opposing each other. The cutting edges 97a and 97b are arranged on one and the same plane at a substantially right angle relative to the longitudinal (turning) axis of the pillar shaped rotatable member 87, namely the straight axis of the terminal portion of the jacketed optical fiber 1, opposite to each other through the above-mentioned longitudinal (turning) axis, and optionally symmetrically with respect to the longitudinal axis. The cutting edges 97a and 97b are straight edges.

The blade holders 94a and 94b have back faces 98a and 98b having an outward inclination from the top to the bottom thereof. The inclined back faces 98a and 98b are connected to side wall faces 99a and 99b through springs 100a and 100b.

The blade device 88 is further provided with a blade-operating member 101. This blade-operating member 101 comprises a pair of leg members 102a and 102b extending through gaps left between the inclined back faces 98a and 98b of the blade holder 94a and 94b and the side wall faces 99a and 99b of the chamber 89; connecting member 103 through which the leg members 102a and 102b are connected to each other; and optionally a handle 104 extending from the connecting member 103.

The blade operating member 101 can move reciprocally in two directions shown by arrows X by the guide of the side wall faces 99a and 99b. When the blade operating member 101 is pushed toward the longitudinal axis of the pillar-shaped rotatable member 87 (namely toward the straightened terminal portion of the jacketed optical fiber 1 placed in the chamber 89), lower end portions of the leg members 102a and 102b of the blade operating member 101 come into contact with the inclined back faces 98a and 98b of the blade holders 94a and 94b.

The lower end portions of the leg members 102a and 102b may come into direct contact with the inclined back faces 98a and 98b or may be brought into indirect contact with the inclined back faces 98a and 98b through rotatable rollers 105a and 105b fixed to the lower ends of the leg members 102a and 102b, as shown in FIG. 23.

The rotatable rollers 105a and 105b allow the lower ends of the leg members 105a and 105b to smoothly move along the inclined back faces 98a and 98b of the blade holders 94a and 94b.

Referring to FIG. 23, when the blade operating member 101 is moved downward by using the handle 104, the lower ends of the leg members 102a and 102b come into contact with the inclined back faces 98a and 98b of the blade holders 94a and 94b and pushing forces are applied to the blade holders 94 and 94b. Due to the applied pushing faces, the blade holders 94a and 94b move toward the longitudinal axis of the pillar-shaped rotatable member 87 (the straight axis of the straightened terminal portion of the jacketed optical fiber 1), along the bottom face 95 of the chamber 89, while stretching the springs 100a and 100b. When the straightened terminal portion of the jacketed optical fiber 1 is placed on the longitudinal axis of the pillar-shaped rotatable member 87, the cutting edges 97a and 97b of the cutting blades 96a and 96b held on the blade holders 94a and 94b cut the jacket layer of the terminal portion of the jacketed optical fiber 1 in two opposite directions at a substantially right angle relative to the straight axis of the terminal portion.

In the above-mentioned cutting operation, the cutting depth of the jacket layer can be controlled by controlling the smallest width of the gap between the cutting edges 97a and 97b approaching toward each other. For this control, stoppers 106a and 106b are preferably arranged between the blade holders 94a and 94b. With respect to the form, dimensions and positions of the stoppers, there is no specific restriction, as long as the closest distance between the cutting edges 97a and 97b approaching toward each other corresponds to the intended cutting thickness of the jacket layer. For example, in FIG. 23, the stopper 106a is fixed to a stopper holder 107 located above the blade holders 94a and 94b. The stopper 107 may be in the form of a plate or bar. Also, the other stopper 106b is located on the bottom face 95 of the chamber 89.

The blade operating member 104 may be further provided with another stopper for adjusting a distance of movement of the blade operating member 104. For example, the above-mentioned stopper holder 107 may serve as the above-mentioned stopper for the blade operating member 101.

The pillar-shaped rotatable member 87 is able to be turned around the longitudinal axis thereof, for example, by using the handle 104, in the directions as shown by arrows Y in FIGS. 23 and 24, so as to allow the blade device 88 to turn around the straight axis of the terminal portion of the jacketed optical fiber 1 held in the chamber 89.

Figure 25:
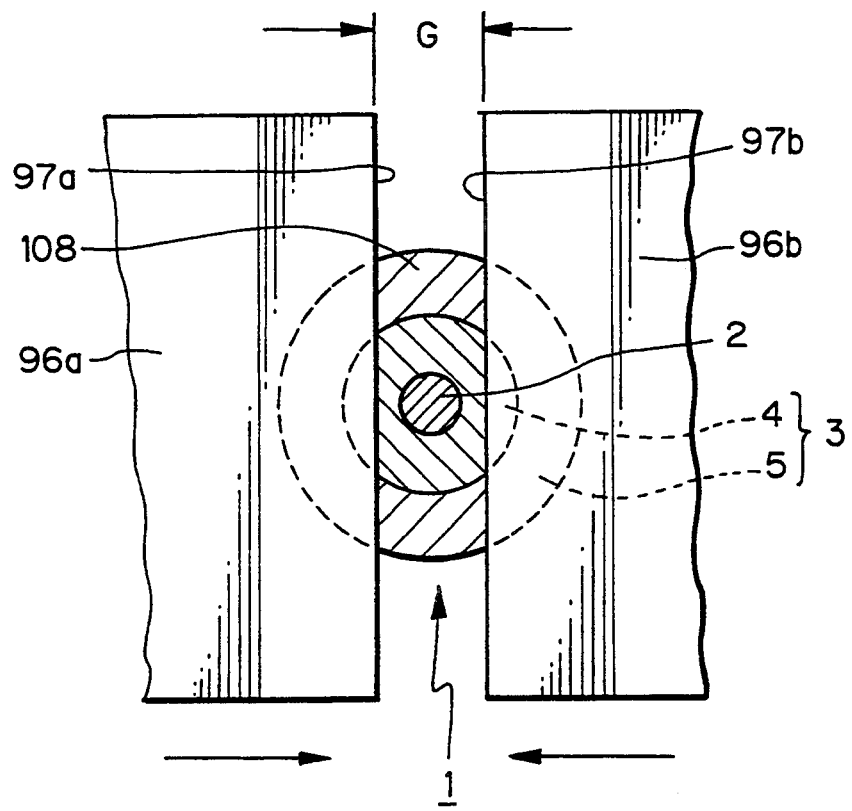
FIG. 25 is an explanatory cross-sectional view of a jacketed optical fiber cut by a first cutting operation by the blade device of FIG. 23.

When the cutting blades 97a and 97b are moved toward each other so as to approach each other along one and the same plane at a substantially right angle relative to the longitudinal axis of the pillar-shaped rotatable member, as shown in FIG. 25, and stopped at positions at which a jacket layer 3 of a jacketed optical fiber is cut at an intended thickness by a pair of cutting edges 97a and 97b, and a gap having a width G is left between the cutting edges 97a and 97b, a portion 108 of the jacket layer 3 remains as an uncut portion thereof.

Figure 26:
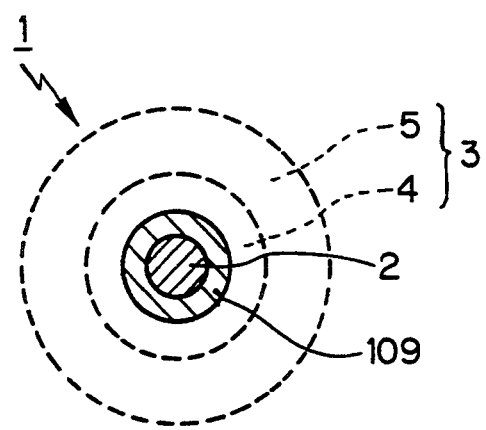
FIG. 26 is an explanatory cross-sectional view of the jacketed optical fiber cut by first and second cutting operations by the blade device of FIG. 23.

Then, the pillar-shaped rotatable member 87 having the cutting edges 97a and 97b penetrated into the jacket layer 3 is turned around the longitudinal axis thereof in two directions as shown by the arrows Y in FIGS. 23 and 24 at an angle of 90 degrees or more, or in one direction at an angle of 90 degrees or more. The uncut portion 108 of the jacket layer 3 is cut and an uncut portion 109 of the jacket layer 3 remains in an annular form as shown in FIG. 26. Namely, by the above-mentioned operations, the jacket layer 3 is cut in an annular form and the cut face of the jacket layer is smooth and on one the same plane at a substantially right angle to the straight axis of the terminal portion of the jacketed optical fiber.

The pillar-shaped rotatable member 87 is turned to return to the original state, and the blade operating member 101 is moved upward to be withdrawn from the jacketed optical fiber 1, the blade holders 94a and 94b are drawn in opposite directions to each other to return to the original positions thereof by the shrinking forces of the stretched springs 100a and 100b.

Figure 27:
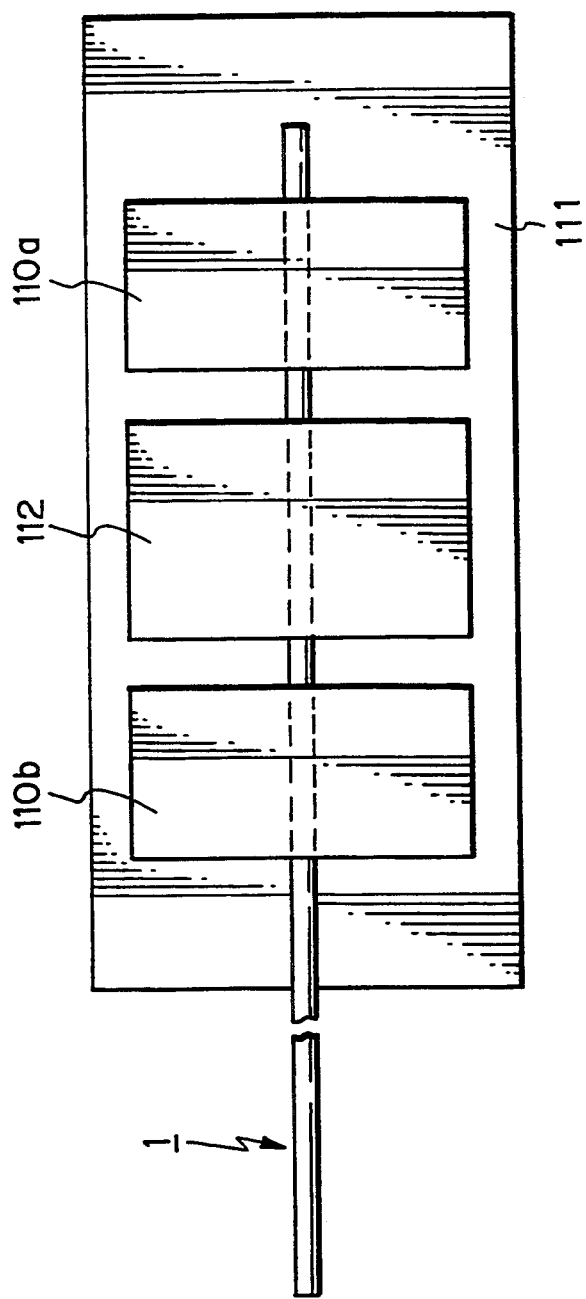
FIG. 27 is an explanatory plane view of another embodiment of the cutting apparatus of the present invention.

FIG. 27 shows an embodiment of a fiber holder usable for the present invention.

In FIG. 27, a pair of clamps 110a and 110b are arranged on a base frame 111. The clamps 110a and 110b are spaced from each other, and a blade device 112 is arranged between the pair of clamps 110a and 110b. A straightened terminal portion of a jacketed optical fiber is inserted into the fiber holder and the blade device and held in a straight line form. The clamp 110a is located close to the end of the fiber, and the other clamp 110b is located on a side opposite to the clamp 110a with respect to the blade device 112.

Figure 28:
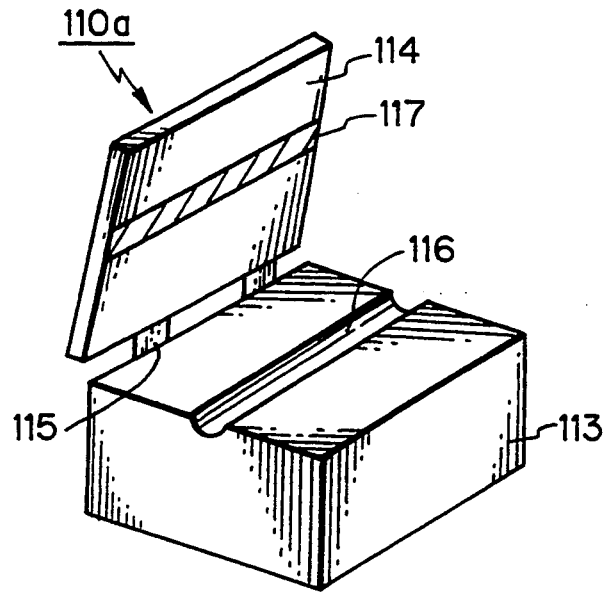
FIG. 28 is a view explaining a constitution of a clamp usable for the present invention.
Figure 29:
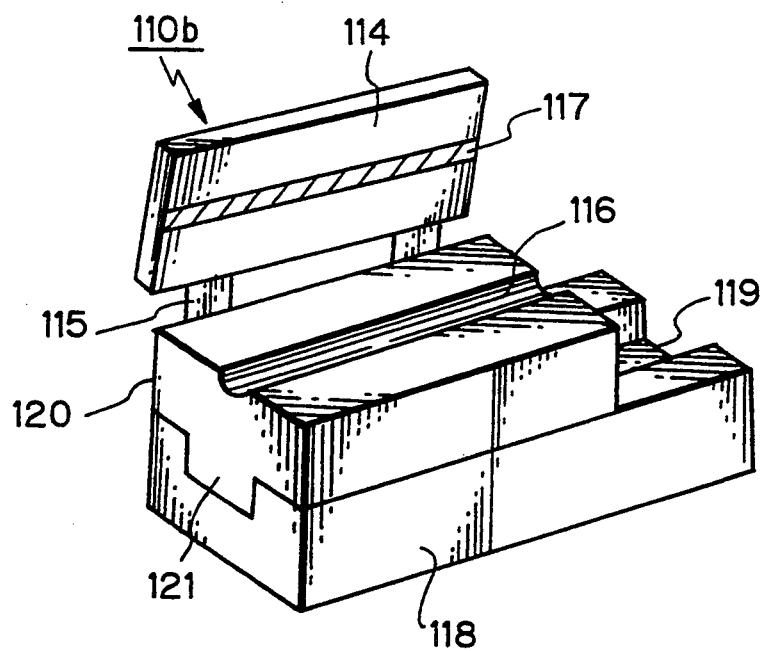
FIG. 29 is a view explaining a constitution of another clamp usable for the present invention.

FIG. 28 shows an embodiment of the clamp 110a to be located close to the end of the straightened terminal portion of the jacketed optical fiber, and FIG. 29 shows an embodiment of the other clamp 110b to be located farther away from the above-mentioned end.

In FIG. 28, the clamp 110a comprises a base member 113 and a lid member 114 pivotally connected at one side end thereof to the base member 113 through hinges 115. The base member 113 has a straight groove 116 formed on the upper face thereof. When a straightened terminal portion of the jacketed optical fiber (not shown) is placed in the straight groove 115 and the lid member 114 is superimposed on the base member 113, the straightened portion in the groove 116 is firmly grasped. The lid member 114 is optionally provided with a slip-preventing member 117 fixed on the inside face of the lid member 114. When the slip preventing member 117 is brought into contact with the straightened terminal portion in the groove 116, the member 117 effectively prevents a slippage of the terminal portion in the groove 116.

In FIG. 29, the clamp 110b to be located farther away from the end of the jacketed optical fiber (not shown) comprises a support member 118 having a sliding groove 119; a slidable base member 120 having a sliding projection 121, which is slidably engaged with the sliding groove 119, and a straight groove 116 for receiving a straightened terminal portion of a jacketed optical fiber (not shown); and a lid member 114 connected to the base member 120 through the hinges 115 and having a slide-preventing member 117 arranged on the inside face thereof.

The base member 120 is movable along the groove 119 of the supporting member 118.

In the fiber-holder as shown in FIGS. 27, 28 and 29, a straightened terminal portion of a jacketed optical fiber 1 is grasped by a pair of clamps 110a and 110b, and a jacket layer of the jacketed optical fiber 1 is cut by the blade device 112 in a direction at an angle of about 90 degrees to the straight axis of the grasped straight terminal portion in the manner as mentioned above, and then the base member 120 of the clamp 110b is moved along the groove 119 in a direction in which the base member 120 moves farther away from the blade device 112, so as to draw out the cut jacket layer from the jacketed optical fiber.

Then the drawn out jacket layer is removed from the clamp 110b and the remaining jacketed optical fiber is removed from the clamp 110b.

By the above-described operations, the jacket layer of the terminal portion of the jacketed optical fiber is smoothly removed from the jacketed optical fiber, without damaging the base optical fiber.

The cutting method and apparatus of the present invention is useful for producing an optical element apparatus by connecting an optical element to an end portion consisting of a base optical fiber of a jacketed optical fiber.

In the connecting method, a jacket layer of a terminal portion of a jacketed optical fiber is removed so that in the terminal portion, a base optical fiber is exposed; an end portion of the exposed base optical fiber is connected to an optical element; and the optical element and the end portion of the base optical fiber connected to the optical element is introduced and fixed in a housing.

In the above-mentioned procedures, the length of the exposed base optical fiber portion is adjusted to a value necessary to firmly bond the optical element to the exposed base optical fiber, and suitable for containing the bonded optical element and the base optical fiber portion in the container.

Also, the remaining portion of the base optical fiber contained in the housing is preferably covered by a primary coating layer.

Further, it is preferable that portions of the jacketed optical fiber in contact with the housing and extending outward from the housing maintain the secondary coating layer thereof.

In the above-mentioned procedures, to provide the terminal portion comprising an end portion consisting of an exposed base optical fiber and an inside portion consisting of a base optical fiber and a primary coating layer covering the base fiber, a transversal cutting operation is applied to a jacketed optical fiber at a location far away from the end thereof by a predetermined distance corresponding to the length of the terminal portion to be contained in the container.

In this cutting operation, the jacket layer is cut in an annular form at a desired depth without damaging the primary coating layer, and the secondary coating layer of the terminal portion is drawn out from the jacketed optical fiber, so as to allow the remaining primary coating layer surface of the terminal portion to be exposed to the outside; and then an end portion of the exposed primary coating layer is removed by dissolving away in a chemical, for example, sulfuric acid, to provide an end portion in which the base optical fiber is exposed.

The optical element to be bonded to the end portion of the optical fiber may be an optical waveguide type optical element comprising an electrooptical crystal base, optical waveguides formed on the base, and electrodes arranged on the base, by which electrodes, the light waves transmitted through the optical waveguides we controlled by outside electric fields, and the light input and output ends of the optical waveguide type optical element are connected to end portions of the exposed base optical fibers of jacketed optical fibers.

To connect the base optical fiber ends to the optical element ends, the end face of the base fiber must be planished (mirror-finished) by a polishing or cleavage method. Also, it is necessary that the end portion of the base optical fiber is inserted into a reinforcing glass capillary tube to increase the connecting area and to enhance the bonding strength to the optical element end. Accordingly, the base optical fiber having the planished end face thereof is preferably exposed at a length, for example 1 mm, corresponding to the length of the reinforcing tube by removing the jacket layer on the fiber core to be exposed. In the other portion of the terminal portion, the base optical fiber should be covered only by a primary coating layer and in the non-terminal portion, the base optical fiber should be protected by the jacket layer comprising the primary and secondary coating layers.

For a relaxation of stress applied to a terminal portion of the optical fiber received in the housing, the terminal portion is placed in a curved form in the container. In this case, the portion of the optical fiber preferably has only the primary coating layer formed from a very soft material and is free from the secondary coating layer formed from a hard material.

For example, when a jacketed optical fiber having a diameter of 900 μm is used, the primary coating layer has an outside diameter of about 360 μm and a thickness of about 120 μm and thus is thick enough to protect the base optical fiber from damage.

In the treatment of the terminal portion of the jacketed optical fiber, it is important that:

(1) only the secondary coating layer is removed at a terminal portion of the jacketed optical fiber while leaving the primary coating layer on the base optical fiber, and (2) in the end portion of the terminal portion, the primary coating layer is removed at a predetermined length thereof by a specific method in which the primary coating layer is not brought into contact with a solid substance, without damaging the base optical fiber.

Referring to FIGS. 30(A) to (F), the jacket layer of a terminal portion of a jacketed optical fiber is removed by the procedures as shown in the drawings.

Figure 30:
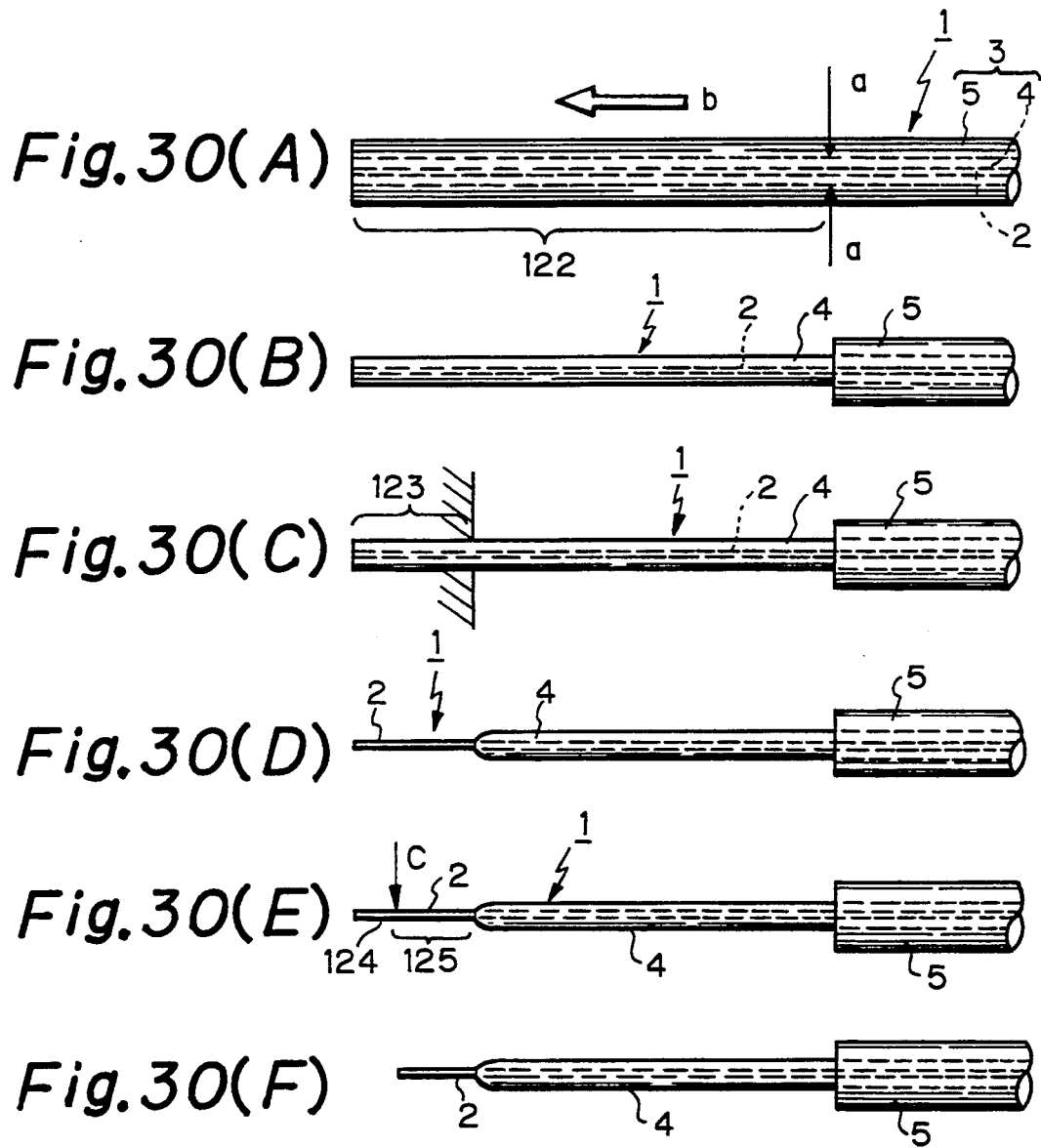
FIGS. 30(A) to (F) show procedures for successively removing a jacket layer from a jacketed optical fiber.

In FIG. 30(A), to remove a terminal portion 122 of a jacketed optical fiber 1, a cutting operation in accordance with the method of the present invention is applied to cut the secondary coating layer 5 in a right angle direction a relative to a straight axis of the fiber 1, while taking care not to damage the primary coating layer 4. The secondary coating layer 5 is cut in an annular form.

In FIG. 30(B), the cut secondary coating layer 5 is removed by applying a drawing out force thereto in a direction as shown by an arrow b in FIG. 30(A). In the terminal portion 122, the primary coating layer 4 is exposed as shown in FIG. 30(B).

To draw out the secondary coating layer 5 by a drawing out force which is small enough to prevent the undesirable damage of the primary coating layer 4, with a high reproducibility, it is preferable that the length of the terminal portion to be removed by one drawing out operation be 30 mm or less. If necessary, the drawing out operation for 30 mm of the secondary coating layer is repeated twice or more until the primary coating layer is exposed at a desired length thereof.

In FIG. 30(C), an end portion 123 of the exposed primary coating layer in the terminal portion 122 is removed by immersing the end portion 123 in a chemical capable of dissolving away the primary coating layer without damaging the base optical fiber 2, for example, a concentrated sulfuric acid. The end portion of the base optical fiber 2 is exposed as shown in FIG. 30(D). The removal of the primary coating layer by the concentrated sulfuric acid is usually carried out at room temperature for 20 to 30 minutes.

In FIG. 30(E), a breaking operation is applied to a point 124 of the exposed base optical fiber 2 to leaving an end portion 125 thereof and to form an end face thereof.

The end face is mirror finished by a polishing or cleavage method. Usually, the end portion 125 of the exposed base optical fiber 2 is 2 to 3 mm.

In FIG. 30(F), the jacketed optical fiber 1 is provided with a terminal portion consisting of an end portion 125 consisting of the exposed base optical fiber 2 and the remaining portion in which the primary coating layer 4 is exposed. The exposed end portion 125 of the base optical fiber 2 is used to bond to an optical element.

Figure 31:
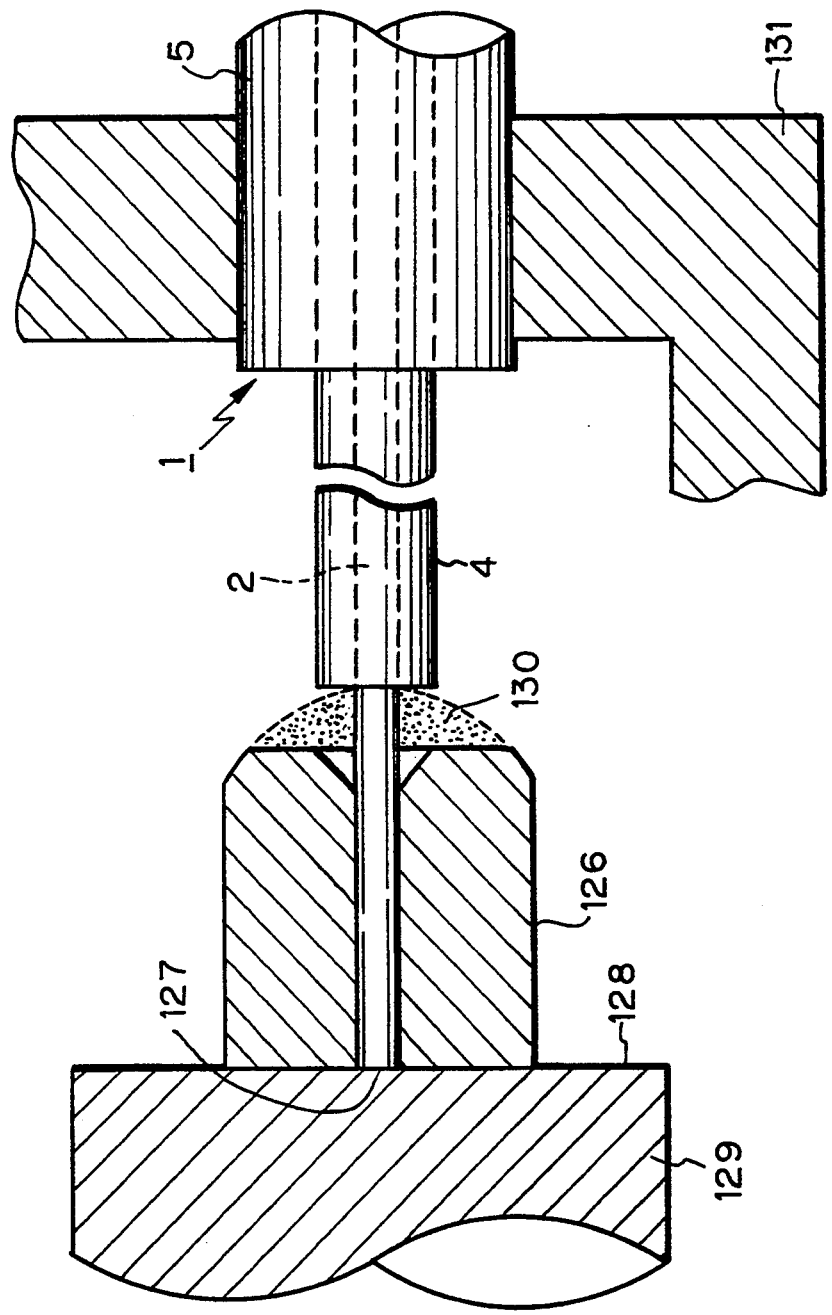
FIG. 31 shows an explanatory cross-sectional front view of an end portion of an optical element apparatus in which an end portion of an optical element treated by the procedures as shown in FIGS. 30(A) to (F) is connected to an end face of an optical fiber.

FIG. 31 shows a connection of an end of the optical fiber prepared by the procedures as shown in FIGS. 30(A) to (F), to an optical element end.

In FIG. 31, a jacketed optical fiber 1 has a terminal portion consisting of an exposed end portion consisting of a base optical fiber 2 having, for example, a diameter of 125 μm and the remaining portion in which a primary coating layer 4 is exposed.

The base optical fiber end portion is inserted into a hole of a quartz glass capillary tube 126 having an inside diameter of 128 μm, an outside diameter of 1 mm and a length of 2 mm. The inserted end portion of the base optical fiber 2 is bonded to the capillary tube 126 by using an ultraviolet ray-curable bonding agent.

An end face 127 of the base optical fiber 2 is connected to an end face 128 of an optical element 129. A portion of the base optical fiber 2 located outside of the capillary tube 126 is necessary as a clearance for optical axis adjustment of the base optical fiber and the optical element, and is optionally covered by a bonding agent layer 130. Referring to FIG. 31, the exposed primary coating layer 4 in the terminal portion is received within a housing 131, and the jacketed optical fiber having the secondary coating layer 5 passes through a hole formed in a side wall of the housing 131. The peripheral surface of secondary coating layer is in airtight contact with the inside face of the hole of the housing 131. As shown in FIG. 31, in the terminal portion of the optical fiber received within the optical element housing, the end portion of the base optical fiber is covered by the capillary tube 126 and the bonding agent layer 130, and another portion of the base optical fiber is covered by the primary coating layer. Therefore, in the space from the connection end face 128 of the optical element 129 to the inside face of the side wall of the housing, the base optical fiber is not directly exposed to the outside, and thus is protected from damage. Therefore, it is possible to allow the terminal portion of the optical fiber located within the housing to have a curved form and a desired length, without damaging the base optical fiber surface.

In conventional methods, the secondary coating layer and the primary coating layer including a buffer layer are simultaneously removed from the jacketed optical fiber.

Accordingly, referring to FIG. 31, the terminal portion of the optical fiber received within the housing consists of an exposed base optical fiber free from the jacket layer. Also, in the conventional method, during the removal of the coating layers, the surface of the base optical fiber is sometimes damaged and thus the resultant optical apparatus exhibits an unsatisfactory reliability.

Figure 32:
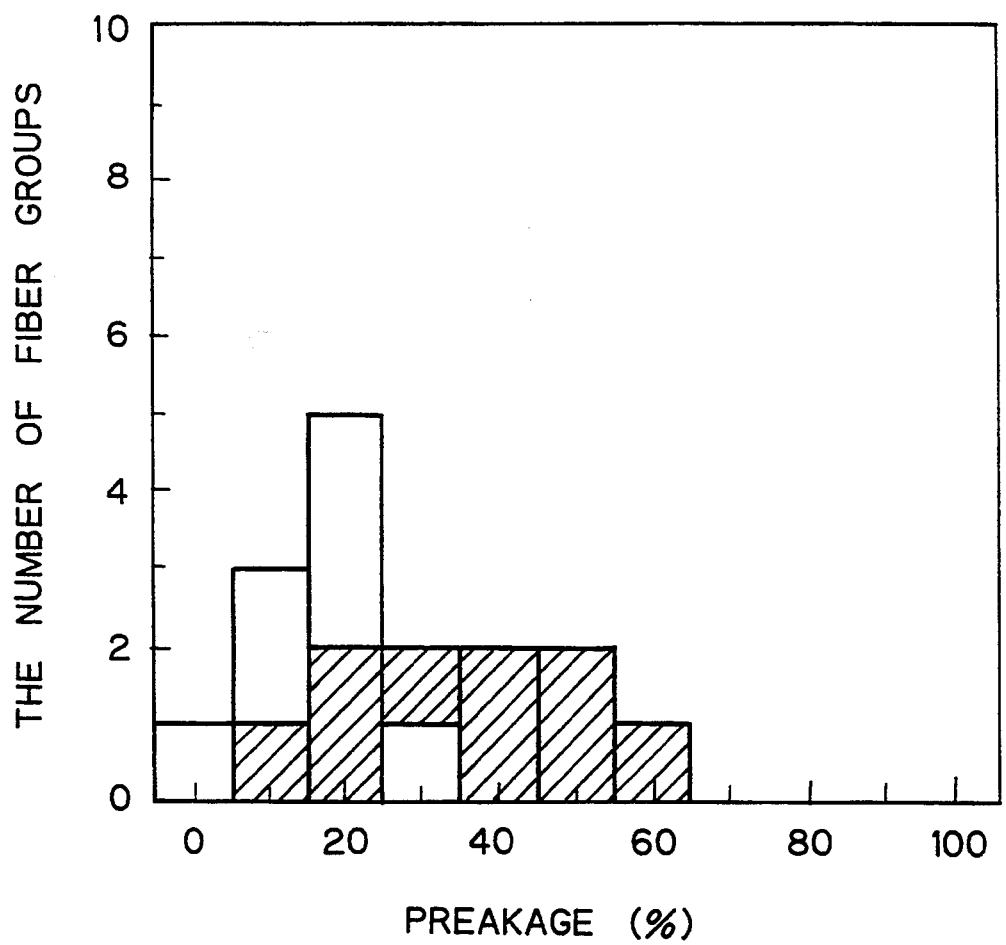
FIG. 32 shows a relationship between breakage (%) of base optical fibers exposed by a conventional jacket layer-removing method and the number of the optical fiber groups to which the conventional jacket layer-removing method was applied.
Figure 33:
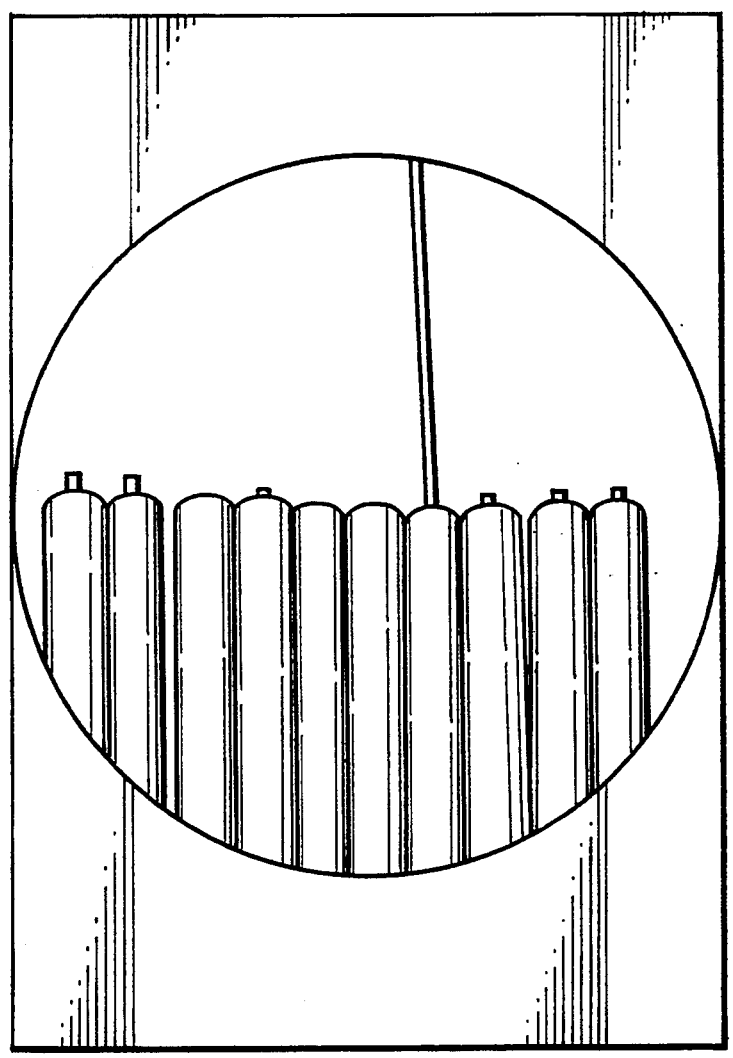
FIG. 33 shows the result of a flexural strength test applied to exposed base optical fibers treated by a conventional jacket layer-removing method.
Figure 34:
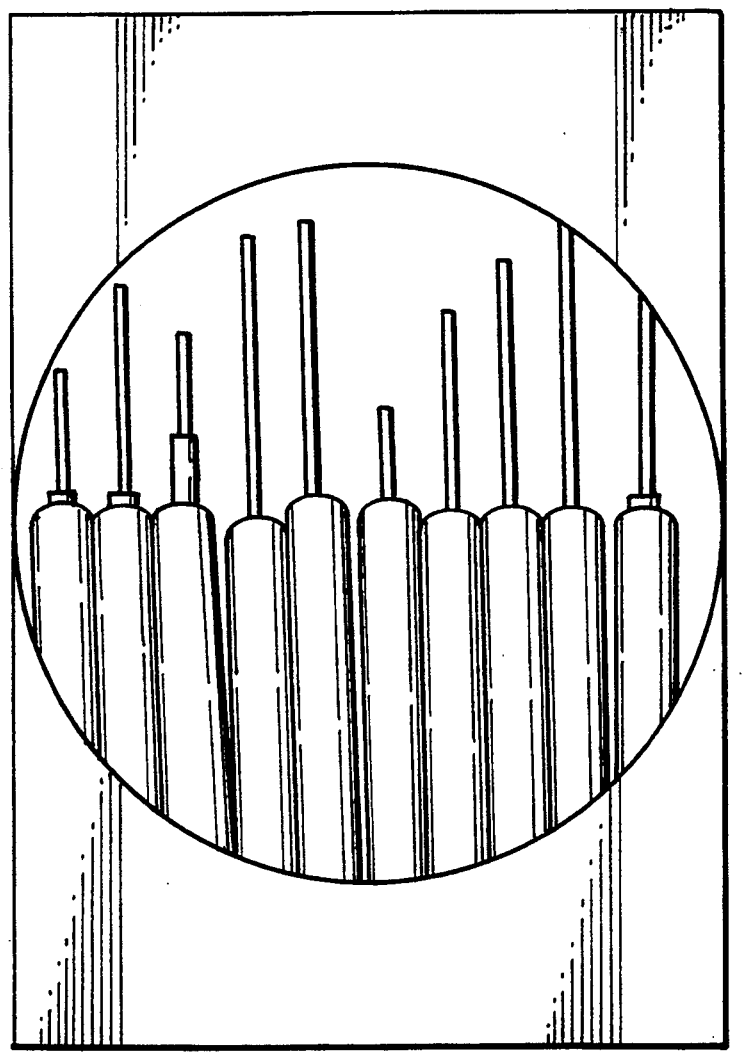
FIG. 34 shows the result of a flexural strength test applied to exposed base optical fibers treated by another conventional jacket layer-removing method.

FIGS. 32 to 34 show results of reliability tests for the mechanical strength of base optical fibers in the jacketed optical fibers treated by conventional methods.

In the tests, jacketed optical fibers each having a diameter of 0.9 mm and a single base optical fiber were thermally straightened at a temperature of 70° C. and terminal portions having a length of 15 mm, of the jacket layers of the jacketed optical fibers were removed by using a conventional jacketed optical fiber stripper. The resultant exposed base optical fiber portions were subjected to a flexural strength test by pushing the exposed base optical fiber portions onto a plastic resin plate five times and it was observed whether the base optical fiber portions were broken. When the secondary coating layers were removed by the conventional stripper, the primary coating layers including the buffer layers were also broken and removed by being pulled out. Also, a large amount of residue of the primary coating layers remaining on the base optical fibers was removed by wiping off ten times with a lens cleaning paper wetted with acetone.

One hundred optical fibers were randomly divided into ten groups each consisting of ten fibers, and the flexural strength test was applied to each group of the fibers, and the percentage of broken fibers was determined.

In FIG. 32, the non-hatched portions of columns indicate the percentage of the base optical fibers broken by the flexural strength test applied immediately after the removal of the jacket layer by the conventional stripper.

FIG. 32 shows that about 20% of the tested base optical fibers were broken in the flexural strength test.

FIG. 33 show that the breakage of the base optical fibers occurred at portions in which the secondary coating layers of the jacketed optical fibers were cut by the conventional stripper, because the cutting operation of the conventional stripper was carried out with poor accuracy and thus in the removal of the secondary coating layer, the primary coating layer including the buffer layer was simultaneously pulled out and broken.

The non-broken base optical fibers were wiped to remove residues of the primary coating layer on the base optical fibers and then subjected to the same flexural strength test as mentioned above. The results are shown by the hatched portions of the columns in FIG. 32.

FIG. 32 shows that the wiping operation in which the surfaces of the base optical fiber are rubbed by the lens cleaning paper, causes the breakage of the base optical fibers to be promoted. Namely, the breakage of the fiber increased to about 40%. As shown in FIG. 34, this breakage occurred in the middle portions of the wiped optical fibers. This means that the increase in breakage is derived from the wiping (rubbing) operation applied to the optical fibers, because the wiping (rubbing) operation sometimes imparts damage to the surfaces of the base optical fibers.

Figure 35:
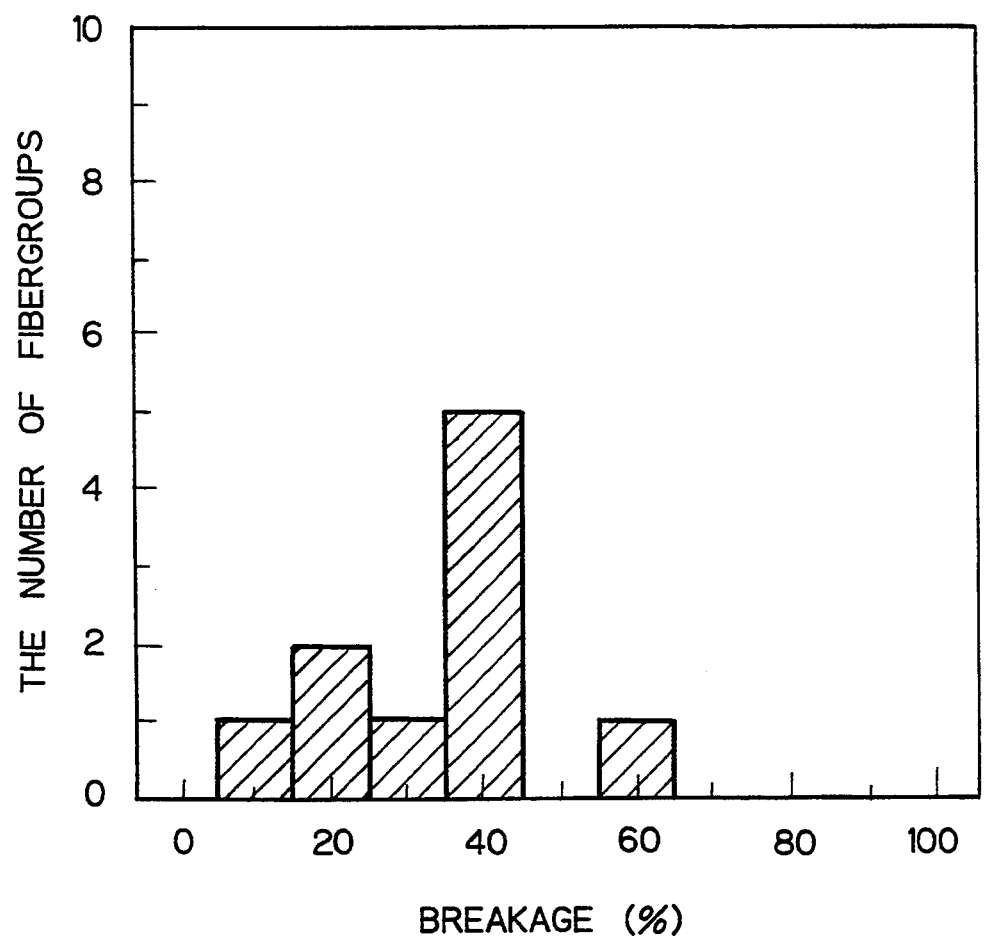
FIG. 35 shows a relationship between breakage (%) of the base optical fibers exposed by a conventional jacket layer-removing method and the number of the fiber groups.

The conventional jacket layer-removing procedures were applied to one hundred jacketed optical fibers and residues of the primary coating layers were removed by wiping procedures. Then the resultant exposed base optical fibers were subjected to the flexural strength test. The results are shown in FIG. 35. FIG. 35 shows that about 40% of the base optical fibers were broken. In about 40% of the breakage, about 10% of occurred in portions of the base optical fibers at which the removal of the jacket layer by the conventional stripper was carried out.

Accordingly, when the optical fibers treated by the conventional jacket layer-removing procedures are used, there is a high probability of breakage of the base optical fibers of about 40% during or after the time the base optical fibers are connected to an optical apparatus, due to damage formed on the base optical fiber surfaces.

When the secondary coating layers in terminal portions of jacketed optical fiber are removed by the above-mentioned method of the present invention, and the resultant primary coating layer-coated optical fibers are subjected to the flexural strength test, no breakage occurs and thus the resultant optical apparatus to which the terminal portions of the optical fiber treated by the method of the present invention has a high reliability for practical use.

EXAMPLES

The present invention will be further explained by the following specific examples.

In the examples, a jacketed optical fiber having a diameter of 0.9 mm and comprising a single base optical fiber having a diameter of 125 μm, a primary coating layer (including a buffer layer) having an outside diameter of 400 ±20 μm and a secondary coating layer:

Example 1

A terminal portion of the above-mentioned jacketed optical fiber was thermally straightened in an alumina tube having an inside diameter of 1 mm at a temperature of 70° C. for 2 minutes.

The secondary coating layer in a terminal portion of the jacketed optical fiber was cut by using the blade device as shown in FIG. 4 without damaging the surface portion of the base optical fiber, and then the cut secondary layer was drawn out. By the cutting operation, it was estimated that the surface portion of the primary coating layer was cut at a depth of about 50 μm.

Figure 36:
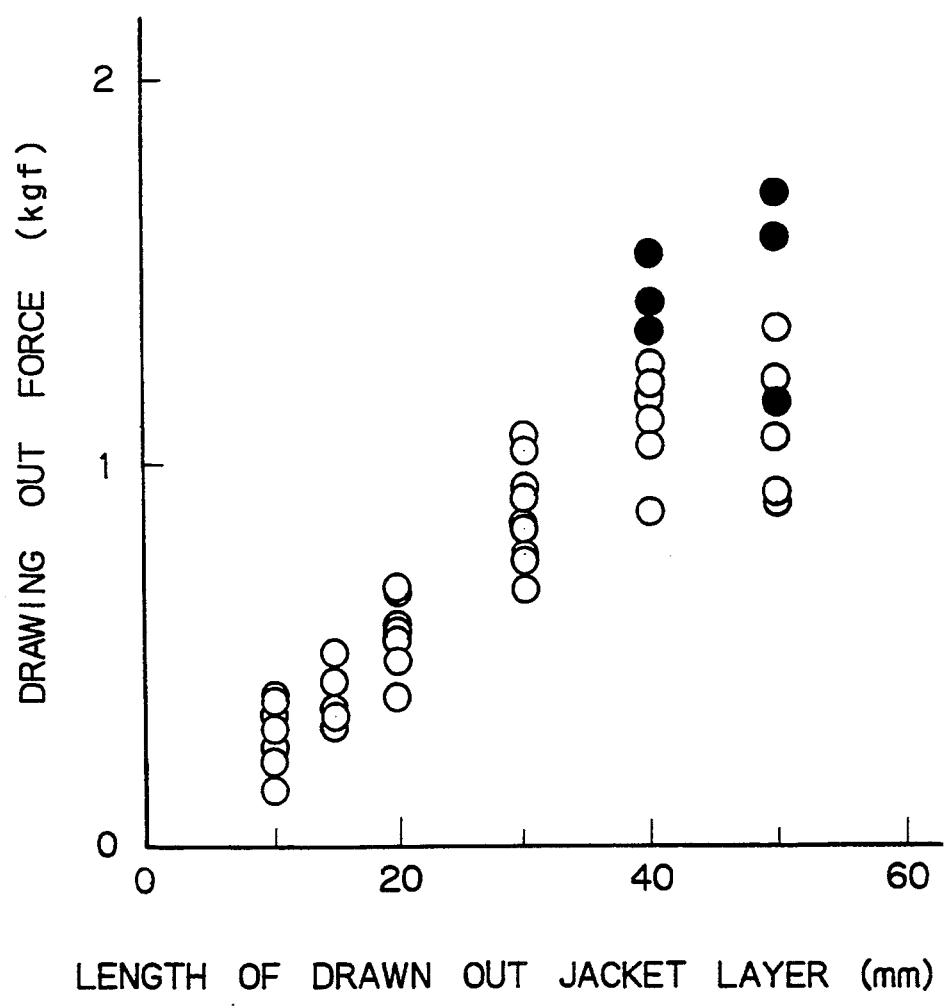
FIG. 36 shows a relationship between drawing out force applied to a cut jacket layer and a length of the drawn out jacket layer.

FIG. 36 show a relationship between the drawing out force (kgf) applied to the cut jacket layer and the length of the drawn out jacket layer. In FIG. 36, the black marks show that by the drawing out test, the secondary and primary coating layers were simultaneously drawn out, and the white marks show that only the secondary coating layer was drawn out with a high reproducibility.

By using the cutting method and apparatus of the present invention, it is possible to draw out only the secondary coating layer having a length of 30 mm or less with a high reproducibility. When the length of the jacket layer to be drawn out is 40 mm or more, the necessary drawing out force is 1.5 kgf or more. When the length of the jacket layer to be drawn out is 70 mm or more, the secondary coating layer made from, for example, a polyamide resin was plastically deformed and thus could not be smoothly drawn out.

If the removal of the secondary coating layer having a length of 30 mm or more is required, the cutting and drawing out operations should be carried out twice or more.

The above-mentioned procedures for removing the secondary coating layer were applied to one hundred jacketed optical fibers. The resultant terminal portions were randomly pushed onto a plastic resin plate 5 times to apply a flexural strength test. It was found that no optical fiber was broken by the test.

Example 2

The terminal portions of the jacketed optical fibers from which the second coating layers were removed was subjected to a treatment in which end portions of the terminal portions were immersed in a concentrated sulfuric acid at room temperature for 15 seconds to 10 minutes to remove the primary coating layer.

Figure 37:
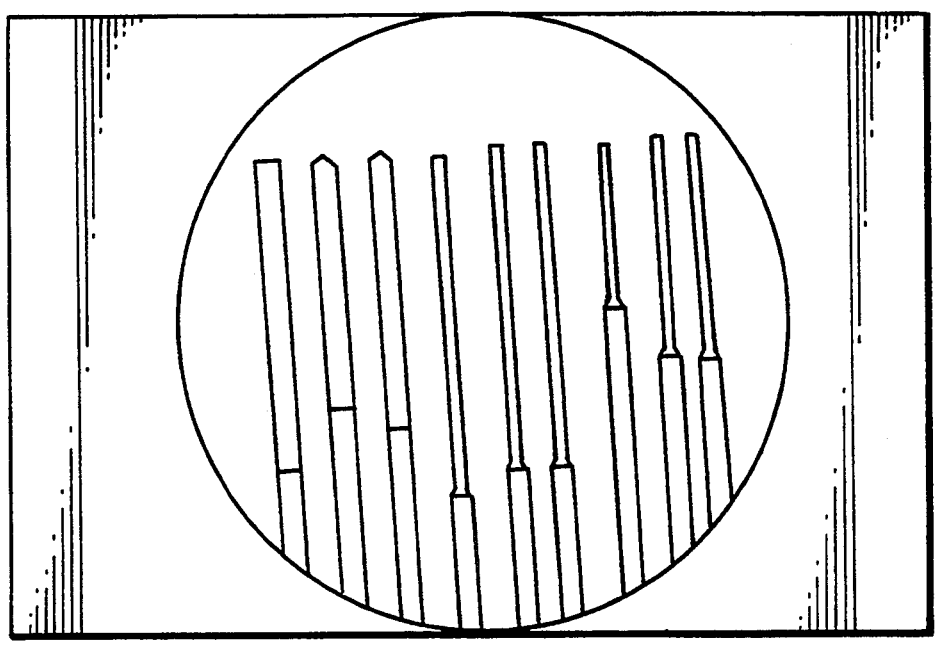
FIG. 37 shows progress in dissolving away of primary coating layers of concentrated sulfuric acid with a lapse of time.

FIG. 37 shows a relationship between an immersing time of the primary coating layer and a degree of removal thereof.

In FIG. 37, the specimens was immersed in the concentrated sulfuric acid for times of, from the left to the right, 15 seconds, 30 seconds, one minute, 2 minutes, 5 minutes, 10 minutes, 15 minutes, 20 minutes and 30 minutes.

Immediately after the immersion, the dissolving (decomposition) of the primary coating layer was initiated, and 15 seconds after the start of the immersion, the progress of the dissolving phenomenon was observed by the naked eye. With the lapse of time, the primary coating layer was swollen and became opaque, while being dissolved away. About 5 minutes after the start of the immersion, a small amount of white residue was found on the surface of the base optical fiber, and 20 to 30 minutes after the start of the immersion, the primary coating layer (including the buffer layer) was substantially completely removed.

The remaining portion of the primary coating layer which was not immersed in the concentrated sulfuric acid was not damaged. This was confirmed by a microscopic observation.

The resultant exposed end portion of the base optical fiber could be mirror-finished by using a conventional polishing apparatus.

Figure 38:
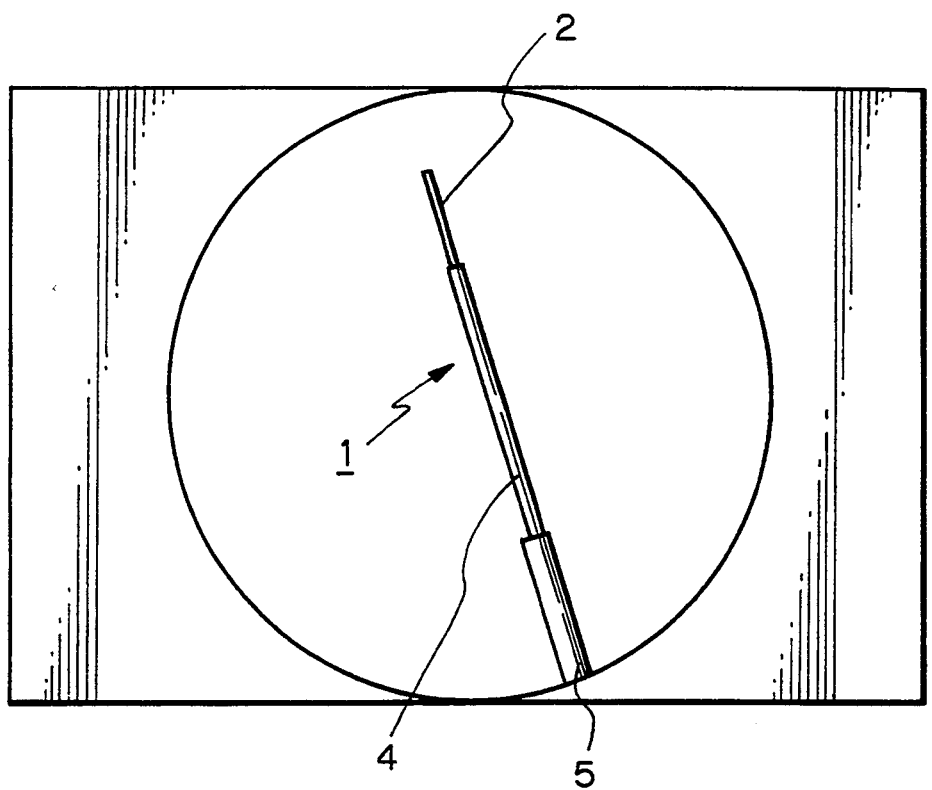
FIG. 38 shows a microscopic front view of a terminal portion of an optical fiber.

The appearance of the terminal portion of the jacketed optical fiber is shown in FIG. 38. In an optical fiber 1, a secondary coating layer 5 was removed in a terminal portion thereof, and a primary coating layer 4 was removed from an endmost portion thereof at which a base optical fiber 2 was exposed.

The exposed base optical fiber end portion was used to connect the optical fiber to an optical element and the other portions of the optical fiber were protected by the primary coating layer or by the jacket layer consisting of the primary and secondary coating layers. Therefore, the resultant optical apparatus connected to optical fibers exhibited a high reliability and reproducibility.

We claim:

1. A cutting method of removing a jacket layer from a jacketed optical fiber, comprising
   (A) straightening a terminal portion of a jacketed optical fiber comprising a base optical fiber and a jacket layer comprising a primary coating layer covering the base optical fiber and a secondary coating layer covering the primary coating layer;
   (B) grasping the straightened portion of the jacketed optical fiber at at least two portions thereof spaced from each other,
   (C) arranging, beside the straightened portion of the jacketed optical fiber, a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber extends at a substantially right angle thereto, and a center line of the gap between the pair of cutting edges intersects the straight axis of the straightened portion of the jacketed optical fiber; and
   (D) cutting the jacket layer of the straight portion of the jacketed optical fiber at a depth equal to or larger than the thickness of the secondary coating layer but smaller than the total thickness of the jacket layers, by moving the pair of cutting blades of the cutting device in at least one transversal direction at a substantially right angle relative to the straight axis of the straightened portion of the jacketed optical fiber.

2. The cutting method as claimed in claim 1, wherein in the blade device, the cutting blades are fixed to the blade holder and arranged in such a manner that the pair of cutting edges of the cutting blades extend in parallel to each other and the gap between the cutting edges has a width equal to or smaller than the outside diameter of primary coating layer but larger than the diameter of the base optical fiber and the blade device is moved toward the straightened portion of the jacketed optical fiber in a direction in which the center line of the gap between the pair of cutting edges intersects the straight axis of the straightened portion of the jacketed fiber.

3. The cutting method as claimed in claim 2, wherein in the cutting step, the cutting operation is applied twice or more to the jacket layer of the straightened portion of the jacketed optical fiber.

4. The cutting method as claimed in claim 3, wherein in the cutting step, the jacket layer of the straightened portion of the jacketed optical fiber is firstly cut by moving the cutting blades in a direction at a substantially right angle to the straight axis of the straightened portion of the jacketed optical fiber, the cutting blades are withdrawn from the first cut jacketed optical fiber, the first cut straightened portion of the jacketed optical fiber is turned around the straight axis thereof at an angle of about 90 degrees, and then the jacket layer of the turned straightened portion of the jacketed optical fiber is secondly cut by moving the cutting blades in a direction at a substantially right angle to the straight axis of the turned straightened portion of the jacketed optical fiber.

5. The cutting method as claimed in claim 3, wherein in the cutting step, the jacket layer of the straightened portion of the jacketed optical fiber is firstly cut by moving the blade device in a first direction at a substantially right angle to the straight axis of the straightened portion of the jacketed optical fiber, and after the cutting device is withdrawn from the jacketed optical fiber and turned around the straight axis of the straightened portion of the jacketed optical fiber at an angle of about 90 degrees, a second cut is made by moving the turned cutting device in a second direction at a substantially right angle to the first direction and to the straight axis of the straightened portion of the optical fiber.

6. The cutting method as claimed in claim 3, wherein in the cutting step, the jacket layer of the straightened portion of the jacketed optical fiber is firstly cut by moving the blade device in a direction at a substantially right angle to the straight axis of the straightened portion of the jacketed optical fiber, and then a second cut is made by turning the blade device around the straight axis of the first cut straightened portion of the jacketed optical fiber at an angle of 90 degrees or more.

7. The cutting method as claimed in claim 1, wherein in the blade device, the cutting blades are fixed to the blade holder and arranged in such a manner that the pair of cutting edges of the cutting blades get closer to each other at the ends thereof located close to the straightened portion of the jacketed optical fiber and get farther away from each other at the opposite ends thereof located away from the straightened portion of the jacketed optical fiber, the gap between the closest ends of the cutting edges has a width equal to or smaller than the outside diameter of the primary coating layer but larger than the diameter of the base optical fiber and the blade device is moved toward the straightened portion of the jacketed optical fiber in a direction in which the center line of the gap between the pair of cutting edges intersects the straight axis of the straightened terminal portion of the jacketed optical fiber.

8. The cutting method as claimed in claim 7, wherein in the cutting step, the cutting operation is applied twice to the jacket layer of the straightened portion of the jacketed optical fiber in two different directions from each other.

9. The cutting method as claimed in claim 8, wherein in the cutting operation, the jacket layer of the straightened portion of the jacketed optical fiber is firstly cut by moving the blade device in a first direction at a substantially right angle to the straight axis of the straightened portion of the jacketed optical fiber, and after the blade device is withdrawn from the jacketed optical fiber and turned around the straight axis of the straightened portion of the jacketed optical fiber at an angle of about 90 degrees, a second cut is made by moving the blade device in a second direction at a substantially right angle to the first direction and to the straight axis of the straightened portion of the jacketed optical fiber.

10. The cutting method as claimed in claim 1, wherein the straightened portion of the jacketed optical fiber is placed in the gap between the pair of the cutting edges in such a manner that the straight axis of the straightened portion of the jacketed optical fiber intersects the center line of the gap between the pair of cutting edges at a substantially right angle thereto, and in the cutting step, the cutting blades of the blade device are moved in opposite directions to each other toward the straightened portion of the jacketed optical fiber to such an extent that the jacket layer of the straight portion of the jacketed optical layer is cut at a depth equal to or larger than the thickness of the secondary coating layer but smaller than the total thicknesses of the primary and secondary coating layers.

11. The cutting method as claimed in claim 10, wherein in the cutting step, the jacket layer of the straightened portion of the jacketed optical fiber is firstly cut by moving the cutting blades of the blade device in opposite directions to each other toward the straightened portion of the jacketed optical fiber, and then a second cut is made by turning the blade device around the straight axis of the straightened portion of the jacketed optical fiber at an angle of 90 degrees or more.

12. The cutting method as claimed in claim 10, wherein the pair of cutting edges of the blade device are arranged in parallel to each other.

13. A cutting apparatus for removing a secondary coating layer from a jacketed optical fiber, comprising (A) a holder for holding a terminal portion of a jacketed optical fiber comprising a base optical fiber, a primary coating layer covering the base optical fiber and a secondary coating layer covering the primary coating layer, said jacketed optical fiber holder having a pair of clamps for grasping the terminal portion of the jacketed optical fiber, spaced from each other to leave a space therebetween through which space a terminal portion of the jacketed optical fiber extends in a straightened form; and (B) a blade device comprising (a) a pair of cutting blades having straight cutting edges and (b) a blade holder by which the pair of cutting blades are held in such a manner that the straight cutting edges are arranged opposite to each other through a gap left therebetween and on one and the same plane through which a straight axis of the straightened portion of the jacketed optical fiber held by the jacketed optical fiber holder extends at a substantially right angle thereto, and a center line of the gap between the pair of cutting edges intersects the straight axis of the straightened portion of the jacketed optical fiber, the blade device being able to move in a direction at an angle of about 90 degrees to the straight axis of the straightened portion of the jacketed optical fiber.

14. The cutting apparatus as claimed in claim 13, wherein the blade device is joined with means for guiding the blade device to allow the cutting blades to move toward the straightened portion of the jacketed optical fiber in a direction at a substantially right angle to the straight axis of the straightened portion of the jacketed optical fiber extending through the jacketed optical fiber-holding space.

15. The cutting apparatus as claimed in claim 13, wherein the straight cutting edges are in parallel to each other, and the width of the gap between the straight cutting edge is equal to or smaller than the outside diameter of the primary layer but larger than the diameter of the base optical fiber.

16. The cutting apparatus as claimed in claim 13, wherein the jacketed optical fiber-holder is further provided with means for turning the straightened portion of the jacketed optical fiber around the straight axis of the straightened portion of the jacketed optical fiber extending through the jacketed optical fiber-holding space.

17. The cutting apparatus as claimed in claim 14, wherein the blade device is joined with means for turning the blade device around the straight axis of the straightened portion of the jacketed optical fiber extending through the jacketed optical fiber-holding space.

18. The cutting apparatus as claimed in claim 13, wherein the cutting blades are fixed to the blade holder and arranged in such a manner that the pair of cutting edges of the cutting blades get closer to each other at the ends thereof located close to the straightened portion of the jacketed optical fiber and get farther away from each other at the opposite ends thereof located away from the straightened portion of the jacketed optical fiber, and the gap between the closest ends of the cutting edges has a width equal to or smaller than the outside diameter of the primary coating layer but larger than the diameter of the base optical fiber.

19. The cutting apparatus as claimed in claim 13, wherein the jacketed optical fiber-holder is provided with a pillar-shaped member having a straight hole formed therein for holding therein the straightened terminal portion of the jacketed optical fiber, and placed between the pair of clamps, the pillar-shaped member being able to rotate around the center line of the straight hole, and the blade device being located at one end of the pillar-shaped member.

20. The cutting apparatus as claimed in claim 19, wherein the pillar-shaped member is supported at end portions thereof by a pair of supports.

21. The cutting apparatus as claimed in claim 19, wherein the pillar-shaped member is provided with means for adjusting the turning angle of the pillar-shaped member.

22. The cutting apparatus as claimed in claim 14, wherein the blade device guiding means comprises a support plate and a pair of poles extending from the support plate in a direction parallel to the moving direction of the blade device, and the blade holder has a pair of holes in which the poles are inserted.

23. The cutting apparatus as claimed in claim 22, wherein a spring is joined to a base portion of each pole.

24. The cutting apparatus as claimed in claim 13, wherein in the blade device, the blade holder comprises a pair of blade-holding poles, the cutting blades are fixed to the blade-holding poles, the cutting edges of the cutting blades are opposite to each other through a gap left therebetween, in which gap the straightened portion of the jacketed optical fiber is held, and the blade-holding poles are able to move in opposite directions to each other toward the center line of the gap.

25. The cutting apparatus as claimed in claim 24, wherein the blade device is contained in a pillar-shaped member rotatable around a straight axis of the straightened portion of the jacketed optical fiber extending through the gaps between the cutting edges.

* * * * *